US012694590B2

(12) United States Patent　　(10) Patent No.:　US 12,694,590 B2

Goedicke et al.　　(45) Date of Patent:　　Jul. 28, 2026

---

(54) AI-ENABLED EARLY-PET ACQUISITION

(71) Applicant: KONINKLIJKE PHILIPS N.V., Eindhoven (NL)

(72) Inventors: Andreas Georg Goedicke, Aachen (DE); Andre Frank Salomon, Aachen (DE); Michael Grass, Buchholz in der Nordheide (DE); Piotr Jan Maniawski, Chagrin Falls, OH (US); Matthias Bertram, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 581 days.

(21) Appl. No.: 18/011,052

(22) PCT Filed: Jun. 16, 2021

(86) PCT No.: PCT/EP2021/066195

§ 371 (c)(1),
(2) Date: Dec. 16, 2022

(87) PCT Pub. No.: WO2021/259720

PCT Pub. Date: Dec. 30, 2021

(65) Prior Publication Data

US 2023/0230297 A1　　Jul. 20, 2023

Related U.S. Application Data

(60) Provisional application No. 63/042,869, filed on Jun. 23, 2020.

(30) Foreign Application Priority Data

Aug. 6, 2020　(EP) ..................................... 20189768

(51) Int. Cl.
G06T 12/00　　　(2026.01)

(52) U.S. Cl.
CPC .......... *G06T 12/00* (2026.01); *G06T 2210/41* (2013.01); *G06T 2211/424* (2013.01)

(58) Field of Classification Search
CPC . G06T 11/003; G06T 11/005; G06T 2210/41; G06T 2211/424; G06T 2211/441
See application file for complete search history.

(56) References Cited

U.S. PATENT DOCUMENTS

2015/0065854 A1*　3/2015　Ahn ..................... A61B 6/5247
　　　　　　　　　　　　　　　　　　600/411
2018/0028079 A1*　2/2018　Gurevich ............. A61B 5/7232
(Continued)

FOREIGN PATENT DOCUMENTS

WO　　2018200493 A1　11/2018
WO　　2019134879 A1　7/2019

OTHER PUBLICATIONS

Merriam-Webster dictionary definition of "machine learning", accessed Nov. 20, 2025. (Year: 2025).*

(Continued)

*Primary Examiner* — Kathleen M Broughton

(57) ABSTRACT

Data processing systems (DPS) and related methods for nuclear medicine imaging. At an input interface (IN), first projection data (λ), or a first image (V) reconstructable from the first projection data, is received. The first projection data is associated with a first waiting period (ΔT*). The first waiting period indicates the time period from administration of a tracer agent to a start of acquisition by a nuclear medicine imaging apparatus (IA) of the projection date. A trained machine learning module (MLM) estimates, based on the first projection data (λ) or on the first image (V), a second projection data (λ') or a second image (V') associable with a second waiting period (ΔT), longer than the first waiting period (ΔT*). Nuclear imaging can thus be conducted quicker. Similar machine learning based data pro- (Continued)

cessing systems and related methods are also envisaged to reduce acquisition time periods or the time it takes to reconstruct imagery.

8 Claims, 12 Drawing Sheets

(56) References Cited

U.S. PATENT DOCUMENTS

| | | | |
|---|---|---|---|
| 2018/0256127 A1 | 9/2018 | Matthews | |
| 2018/0315225 A1 | 11/2018 | Zhang | |
| 2019/0325620 A1* | 10/2019 | Adler | G06T 7/10 |
| 2020/0027251 A1* | 1/2020 | Demesmaeker | G06T 11/006 |
| 2020/0279411 A1* | 9/2020 | Atria | G06T 11/006 |
| 2021/0074033 A1* | 3/2021 | Vija | G01T 1/1603 |

OTHER PUBLICATIONS

Sanaat et al, A novel convolutional neural network for predicting full dose from low dose PET scans, 2019, IEEE Nuclear Science Symposium and Medical Imaging Conference, pp. 1-4. (Year: 2020).*
Reith et al, Application of Deep Learning to Predict Standardized Uptake Value Ratio and Amyloid Status on F-Florbetapir PET Using ADNI Data, 2020, A. Journal of Neuroradiology, 41(6) pp. 1-10. (Year: 2020).*
Joseph et al, Predicting Waiting Times in Radiation Oncology using Machine Learning, 2017, IEEE International Conference on Machine Learning and Applications, pp. 1-7. (Year: 2017).*
International Search Report and Written Opinion of PCT/Ep2021/066195, dated Sep. 15, 2021.
Wu, Qi et al "An Exploration of the Prognostic Utility of Shortened Dynamic Imaging Protocols for PET-EDG Scans", 2019 IEEE Nuclear Science Symposium and Medical Imaging Conf.
Cheng, Lishui et al "Accelerated Iterative Image Reconstruction using a Deep Learning Based Leapfrogging Strategy", Conference Paper 2017.
Kaplan, Sydney et al "Full-Dose PET Image Estimation from Low-Dose PET Image using Deep Learning: A Pilot Study", Journal of Digital Imaging, vol. 32, 2019, pp. 773-778.
Kang, Jiayin et al "Prediction of Standard-Dose PET Image by Low-Dose PET and MRI Images", MLMI, 2014, LNCS 8679, pp. 280-288.
Xiang, Lei et al "Deep Auto-Context Convolutional Neural Networks for Standard-Dose PET Image Estimation from Low-Dose PET/MRI", Neurocomputing, 2018.
Kippenhan, J. Shane et al "Evaluation of a Neural-Network Classifier for PET Scans of Normal and Alzheimer's Disease Subjects", The Journal of Nuclear Medicine, vol. 33, No. 8, Aug. 1992.
Teramoto, Atsushi et al "Automated Classification of Pulmonary Nodules through a Retrospective Analysis of Conventional CT and Two-Phase PET Images in Patients Undergoing Biopsy", Asia Oceania Journal of Nuclear Medicine & Biology, vol. 7, No. 1, 2019, pp. 29-37.
Micthell, T.M. "Machine Learning", p. 2, SECTION 1.1. Mcgraw-Hill, 1997.
Ronneberger, Olaf et al "U-Net: Convolutional Networks for Biomedical Image Segmentation", Medical Image Computing an Dcomputer-Assisted Intervention—MICCAI 2015, vol. 9351, pp. 234.
Wang, W. "Systematic and Distributed Time-of-Flight List Mode PET Reconstruction", 2006 IEEE Nuclear Science Symposium Conference Record, pp. 1715-1722.

* cited by examiner

NIR

⊙Z

NIA

ER

D

SC

DAQ

PAT

γ₂

LOR

γ₁

AE

TB

DPS

RECON

λ

IN

PU

MLM

V

DB

DD

T $\Delta T_W$ $\Delta T_A$ $\Delta T_R$ $\Delta T_W^*$ $\Delta T_A^*$ $\Delta T_R^*$ $T_0$ $T^*$

AI-ENABLED EARLY-PET ACQUISITION

CROSS-REFERENCE TO PRIOR APPLICATIONS

This application is the U.S. National Phase application under 35 U.S.C. § 371 of International Application No. PCT/EP2021/066195, filed on Jun. 16, 2021, which claims the benefit of U.S. Provisional Patent Application Ser. No. 63/042,869, filed Jun. 23, 2020 and European Patent Application No. 20189768.3, filed on Aug. 6, 2020. These applications are hereby incorporated by reference herein.

FIELD OF THE INVENTION

The invention relates to data processing systems for nuclear medicine imaging, to training systems for training, based on training data, machine learning modules for use in nuclear imaging, related methods, to a computer program element and to a computer readable medium.

BACKGROUND OF THE INVENTION

Emission imaging allows functional imaging as opposed to structural imaging such as X-ray imaging (for example CT (computed tomography) imaging). Functional imaging includes PET (position emission tomography) or SPECT (Single-photon emission computed tomography) imaging modalities. Functional imagery represents what organs do rather than their morphology which is what structural imagery represents. Both functional and structural imaging can be used in combination.

In more detail, PET is an established nuclear medicine imaging modality, clinically used to visualize functional processes in the human body. The patient is administered a positron-emitting radio-pharmaceutical which is either directly involved in targeted metabolic processes or binds to specific receptors.

Photons emitted (in opposite spatial direction) by proton annihilation with a local electron during the isotope decay are detected by, typically ring-shaped, detector arrangements outside the body. Collecting these detection events over time and pre-processing the data by separating true coincidence events from random or scattered events, allows for a (three dimensional) reconstruction of emission imagery that represents tracer distribution inside the body. Typically, in combination/overlay with additional anatomical information (provided by for example by CT or MRI (magnetic resonance imaging), deviations from the expected/typical tracer distribution may be observed. The changes are associated with changes of physiological metabolic patterns. Emission imagery may thus help identify malignant processes, such as tumor formation.

PET image quality and corresponding diagnostic value depends on certain factors, including the tracer's binding/accumulation affinity, its physiological clearance characteristics, as well as the sensitivity of the scanner, the administered tracer amount, and the isotope's positron yield.

Current clinical workflow settings account for these impact factors by established dose administration schemes, patient waiting times as well as standard image acquisition duration times. During the patient waiting times, the tracer is allowed to accumulate at the target region. Due to the statistical nature of the (isotope-decay-based) acquisition process, the image acquisition duration time (also called "scan time") required to achieve a desired image quality and diagnostic value may also depend on or more the above mentioned factors.

Given that the administrable tracer amount is limited (primarily for radiation safety but also for cost reduction reasons), scan time and—within legal boundaries possible—individual tracer amount adjustments are used in order to achieve a certain image quality level required for subsequent diagnosis.

The scan time is mainly determined by the amount of information that has to be collected in order to sufficiently support the detection of spatial tracer density changes of a certain spatial extension and quantitative variation range, given the local image intensity variations (clustered "noise") originating in the intrinsic variations in the detection process. In simplifying terms: the longer the acquisition time period (per bed position), the more the final image approaches the ideal, non-noisy, "true" image.

In clinical practice, scan times have to be fixed for both workflow reasons but also as patients only tolerate a limited scan procedure duration. In addition, the patient waiting time from tracer administration until the scan can commence (acquisition start time) may run well to 60 minutes or longer for a given patient.

SUMMARY OF THE INVENTION

There may be a need for improving nuclear medicine imaging, in particular reducing certain time periods involved in nuclear medicine imaging.

The object of the present invention is solved by the subject matter of the independent claims where further embodiments are incorporated in the dependent claims. It should be noted that the following described aspect of the invention equally applies to the data processing systems for nuclear medicine imaging, to the training systems for training a machine learning module for use in nuclear imaging, to the related methods, to the computer program element and to the computer readable medium.

According to a first aspect of the invention there is provided a data processing system for nuclear medicine imaging, comprising:

an input interface for receiving first projection data or a first image reconstructable from the first projection data, and the first projection data associated with a first waiting period, the said first waiting period indicating the time period from administration of a tracer agent to an start of acquisition by a nuclear medicine imaging apparatus of the projection data; and a previously trained ("pre-trained") machine learning module, configured to predict or estimate, based on the first projection data or on the first image, a second projection data or a second image associable with a second waiting period, longer than the first waiting period.

A data processing system for nuclear medicine imaging, comprising:

an input interface for receiving first projection data or a first image reconstructable from the first projection data, and the first projection data associated with a first acquisition time period for the acquisition by a nuclear medicine imaging apparatus of the projection data in respect of a patient with incorporated tracer agent; and a trained machine learning module configured to predict or estimate, based on the first projection data or on the first image, second projection data or a second image associable with a second acquisition time period, longer than the first acquisition time period. In embodiments the second waiting period, or the second acquisition time period is prescribed by the type of tracer agent.

In another aspect there is provided a data processing system for nuclear medicine imaging, comprising:

an iterative image reconstructor to reconstruct a first image in a given iteration step (i) from projection data acquired by a nuclear medicine imaging apparatus; and a trained machine learning module configured to predict or estimate, based on the first image, a second image, the iterative reconstructor then to reconstruct a next image in a next iteration step based on the second image. The projection data for this intra-reconstruction application of the machine learning module may have been obtained in reduced scan or waiting time as per any one or both of the above mentioned systems, each may be using a respectively trained machine learning module.

In embodiments, the system in any one of the above embodiments or aspects, includes a sampler, the said first image or the projection data being part of a superset of a respective image or projection data, sampled by the sampler from the respective superset, and/or wherein the said predicted second image or the second projection data form parts of a respective superset assemblable by an image assembler.

In embodiments, the nuclear medicine imaging apparatus is configured for any one of PET and SPECT imaging.

In another aspect there is envisaged a training system configured for training, based on training data, a machine learning module for nuclear imaging to obtain the pre-trained machine learning module as used in any one of the above mentioned systems.

A data processing method for nuclear imaging, comprising:

receiving first projection data or a first image reconstructable from the first projection data, and the first projection data associated with a first waiting period, the said first waiting period indicating the time period from administration of a tracer agent to a start of acquisition by a nuclear medicine imaging apparatus of the projection data; and processing by a trained machine learning module the first projection data or the first image to predict or estimate a second projection data or a second image associable with a second waiting period, longer than the first waiting period.

In another aspect there is provided a data processing method for nuclear imaging, comprising:

receiving first projection data or a first image reconstructable from the first projection data, and the first projection data associated with a first acquisition time period for the acquisition by a nuclear medicine imaging apparatus of the projection data in respect of a patient with incorporated tracer agent; and processing by a trained machine learning module the first projection data or the first image, to predict or estimate second projection data or a second image associable with a second acquisition time period, longer than the first acquisition time period.

In yet another aspect there is provided a data processing method for nuclear imaging, comprising:

reconstructing a first image in a given iteration step from projection data acquired by a nuclear medicine imaging apparatus;

processing by a trained machine learning module the first image to predict or estimate a second image; and reconstructing a next image in a next iteration step based on the second image.

In another aspect there is provided a training method for training, based on training data, a machine learning module for nuclear imaging to obtain the pre-trained machine learning module as used in any one of the above mentioned methods.

In another aspect there is provided a method of procuring training data for training a machine learning module for nuclear imaging, the training data being based on i) historic dynamic PET projection data, or ii) on down-sampled historic projection data.

In yet another aspect there is provided an imaging arrangement, comprising a nuclear imaging apparatus and a system as in any one of the above described embodiments or aspects.

The proposed systems and methods allow significantly shortening time periods involved in nuclear medicine imaging, in particular the scan time and/or post-tracer-administration waiting times, to improve patient's comfort and imaging throughput. This is of particular benefit in ever busy and stretched national health facilities around the world that need to cope with an ageing population and an increase in unhealthy life-styles. Reconstruction times can also be reduced.

In other words, the proposed machine learning module allows implementing accelerated nuclear medicine protocols. The proposed machine learning module allows estimating from early imagery or early projection data, later imagery or later projection data, thus obviating the need for the traditionally longer time periods. The estimated imagery allows the clinician to ascertain how the imagery would have looked like had the longer patient waiting period or acquisition periods been exhausted. Furthermore, or instead, reconstruction time period can be reduced. The likelihood for iterative reconstruction algorithms to get trapped in local minima can be avoided, thus improving image quality.

In another aspect there is provided a computer program element, which, when being executed by at least one processing unit, is adapted to cause the processing unit to perform the method as per any one of the above mentioned embodiments.

In another aspect still, there is provided a computer readable medium having stored thereon the program element.

Definitions

"user" relates to a person, such as medical personnel or other, operating the imaging apparatus or overseeing the imaging procedure. In other words, the user is in general not the patient.

In general, the "machine learning module" is a computerized arrangement that implements a machine learning ("ML") algorithm that is configured to perform a task. The machine learning algorithm may be based on a machine learning "model". In an ML algorithm, task performance improves measurably after having provided the arrangement with more (new) training data or sufficient variance. The performance may be measured by objective tests when feeding the system with test data. The performance may be defined in terms of a certain error rate to be achieved for the given test data. See for example, T. M. Mitchell, "*Machine Learning*", page 2, section 1.1, McGraw-Hill, 1997.

"Projection data" as used herein is (raw) data as detected at the PET detector (projection domain) and that can be turned by a reconstruction algorithm into emission imagery in image domain. The projection data may be represented in list mode or sinogram mode. List-mode can be converted into sinogram mode, for example by rebinning procedures.

"Early data" and "later data" as used herein includes the following: Early data includes early emission projection data or early emission imagery. Early emission imagery is imagery in image domain reconstructable from early emission projection data. Early emission projection data is projection data acquired after reduced post-tracer-administration-waiting time or acquired with reduced acquisition time period. The reduced time periods are shorter than longer such periods used in "later" data.

Specifically, later data, the opposite of early data, includes later emission projection data and/or later emission imagery reconstructable from later emission projection data.

The early/later data also includes (intermediate) imagery produced during iterative reconstruction, with "early"/"later" relating to the reconstruction cycle/step at which the respective (intermediate) image is obtainable. The reconstruction cycle/step may represent a convergence state.

BRIEF DESCRIPTION OF THE DRAWINGS

Exemplary embodiments of the invention will now be described with reference to the following drawings, which, unless stated otherwise, are not to scale, wherein.

Exemplary embodiments of the invention will now be described with reference to the following drawings wherein.

DETAILED DESCRIPTION OF EMBODIMENTS

Figures 1A, 1B:
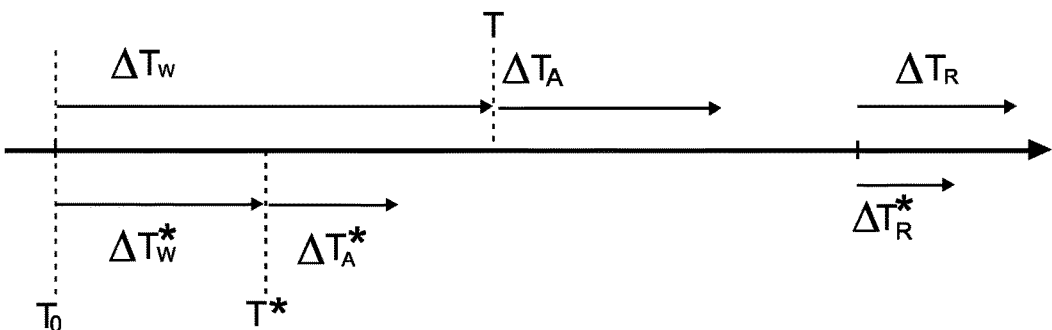
FIG. 1A shows a block diagram of a nuclear imaging arrangement including a nuclear imaging apparatus.
FIG. 1B shows a time line of time periods involved in nuclear imaging protocols.

With reference to FIG. 1A, there is shown a schematic block diagram of a nuclear medicine imaging arrangement NIR.

The arrangement NIR includes a nuclear imaging apparatus NIA and a data processing section DPS. Broadly, the nuclear imaging apparatus NIA outputs emission projection data $\lambda$ which can be processed in the data processing section DPS into emission imagery V that can be stored in a data base such as a PACS (picture archiving and communication system) in a HIS (hospital information system) or any other memory DB. The emission imagery may be visualized on a display device DD or can otherwise be processed. The emission projection data $\lambda$ can be provided by wired or wireless connection from the imaging apparatus MIA to the data processing section DPS.

Broadly, there is proposed herein a novel data processing section DPS that allows reducing certain time periods involved in nuclear imaging (also referred to herein as emission imaging). The data processing section is thus configured for accelerated nuclear imaging. The data processing section DPS includes a re-constructer component RECON that implements a PET/SPECT reconstruction algorithm. The reconstruction algorithm allows computing the desired emission imagery from the projection raw data $\lambda$. In order to achieve the accelerated emission imaging protocols, the re-constructer RECON co-operates with a machine learning module MLM pre trained on training data, historic or synthesized. The machine learning module MLM is computational entity that arranged in hardware or in software or partly in both, that applies a pre-trained-machine learning model to input data. Operation of the novel processing section DPS and in particular the co-operation between the re-constructer RECON and the machine learning module MLM will be explored more fully below.

Explaining now in first more detail operation of the nuclear imaging apparatus NIA, reference is now made to a PET imager. However, other nuclear or emission imaging modalities such as SPECT or planar scintigraphy are also envisaged herein, and the principles to be described herein are applicable to such other emission imaging modalities also.

The PET imager NIA is usually, but not necessarily, arranged in tandem with an MRI imager or a computed tomography scanner CT. MRI or CT provide structural information about an anatomy, whilst the PET imager provides functional information, including for example organ activity.

Broadly, the PET imager NIA includes a gantry in which it is arranged, around a hollow examination region ER, an annular detector unit D. The annular detector unit D forms the bore of the imager NIA. The annular detector unit D comprises am annular scintillator SC. Prior to imaging, a radio tracer substance (tracer agent) is administered to the patient PAT. The substance includes a suitable radionuclide. The administered substance distributes in the patient's body. The patient is asked to lie on an examination table TB. The table TB, with the patient PAT on it, is slid into the examination region ER as shown in side elevation in FIG. 1A so that at least an anatomy of interest (ROI) is now partly or completely surrounded by the scintillator SC ring. A longitudinal axis of the patient PAT extends into the bore and is aligned with an imaging axis Z. The imaging axis Z extends perpendicularly into the drawing plane of FIG. 1A. The scintillator ring SC, of which there can be more than one arranged one after the other along the Z axis, is essentially a gamma camera.

In a total body ("TB") configuration, the bore may have a length along imaging axis Z to surround the whole of the patient at once. However total body configurations are not necessarily required herein in all embodiments and standard bore lengths covering merely a longitudinal section of the patient at a time are also envisaged. In imagers with standard bore length, there may be a relative translational motion along axis Z during imaging between the scintillator ring SC and the examination table to still perform a total body acquisition protocol. No such motion is required in the TB type configuration. In use, during a "scan", also referred to herein as the acquisition period, the scintillator ring SC is enabled to detect gamma radiation caused by the tracer agent. The gamma radiation is detected as emission prediction data by the detection unit D. The emission prediction data may be reconstructed by the reconstructor RECON into 3D emission imagery. During the scan, there may or may not be the said translation motion as required by different protocols and imaging objectives.

In more detail, the administered and accumulated radionuclide disintegrates after a certain amount of time to produce a decay event. This decay event results in a positron being emitted. The positron, after its creation, travels usually a short distance and then interacts with surrounding patient tissue. More particularly, the positron collides at a certain location with an encountered electron in patient tissue. This collision results in an annihilation event AE at said in-patient location. The annihilation of the two colliding elementary particles, the positron and electron, in turn creates a pair of γ photons, referred to herein as γ1, γ2 or "gammas", or "gamma" for either one. These γ photons are known to have defined energy values of 511 keV. The γ photons of each pair travel in opposite direction at 180° from the creation site AE towards different, diametrically located, portions of the scintillator ring SC and are then incident thereon.

The scintillator ring SC comprises crystal blocks contiguously arranged in the ring. The crystal blocks of the scintillator SC are coupled to a bank of photodiodes and form part of the imager's data acquisition system DAQ.

The crystal blocks are coupled to respective photodiodes. Each crystal element, together with its spatially associated one or more photodiodes, forms a respective detector element. The photodiodes of the detector elements are coupled to further circuitry such a position resolver PR circuity and timing circuitry TC, both of which will be discussed in more detail further below.

Referring now first back to the γ photons in more detail, these are, as said, incident on diametrically opposed crystal blocks of the scintillator ring SC and cause optical light photons to be released. The optical photons are registered by the photodiodes that are coupled to the affected crystal element.

The photodiodes respond to the light photons by outputting a related electrical signal, such as a voltage or a current.

Each crystal block in the scintillator ring SC can be indexed by a unique position indicator X. This position index X is then also one of the detector element, in particular one of the photodiode which is coupled to the respective crystal.

The respective group of detector elements activated by the gammas may thus be characterized by a list of their indices $(x_j)$ for each gamma. There are two of such lists for each pair of gammas.

Referring now in more detail to the position resolver circuitry, this may include an Anger logic or a singles processing units or others. The position resolver circuitry PR receives the electrical signals as detected by the activated photodiodes. The position resolver circuitry PR provides, based on the list of activated photodiodes, an estimate x of the index P where the first incident occurred. The position resolver assigns to each of the gamma photon γ1,γ2 in a pair a respective position estimate x1, x2 for the activated crystal blocks. The estimated locations x1, x2 are approximately diametrically located across the region ER of scintillator ring SC.

As will be appreciated from the above, each of the two gamma photons γ1,γ2 in a pair will give rise to respective detection events. The detection events include the electrical signals produced by the respective responding photodiodes PHD. These two detection events need to be associated with each other so that the two gamma photons γ1,γ2 can be recognized to constitute a pair caused by the same annihilation event. This association is time based and done by a timing circuit TC. The detection events that occur at roughly the same time, up to a certain time allowance, are registered by the timing circuit TC as co-incidental and constitute detection events of timing circuit photons γ1,γ2 making up a pair for a single annihilation event. Once recognized by the timing circuit TC as a pair, their respective estimated location of impact x1, x2 as provided by the position resolver PR constitute then for each pair a line of response LOR. The LOR forms the geometric line that connects the two locations x1, x2 of first interaction. The two locations x1, x2 further determine a direction of impact which can be quantified by angular co-ordinates Φ,θ for each gamma in terms of elevation and azimuth.

In sum, the emission projection (raw) data λ as provided by the data acquisition section DAQ represent coincidence events. Each such event is a near simultaneous detection (within an applicable time window of about 6-12 nanoseconds) of the pair of photons gamma 1, gamma 2 by a pair of opposed crystal blocks sections of the scintillator ring SC. Each such coincidence events thus defines the respective LOR.

Different representations of the measured projection raw data λ are envisaged herein, including list mode and sinogram mode. The list mode format is preferred however as the sinogram mode data can be converted from the list mode data by rebinning. In list mode, the acquired raw data is organized as entries in a list, each entry comprising data portions that may specify the number of counts detected within the window at a given detector section, coordinates of the section of the detector SC ring where the counts were detected, angular data, time stamps etc. The sinogram data may be obtained from list mode data by rebinning, that is, by reorganizing the list mode data to obtain spatially resolved data per angle of LOR.

With continued reference to FIG. 1A, the re-constructer RECON of the novel data processing section DPS can be understood as a mapping from projection domain to image domain. The projection domain is located at the detector unit D where the projection data is defined. In contrast, the image domain is located in the examination region ER and can be defined by a spatial 3D grid of voxels positions. The re-constructer RECON is a computational module, arrange in hardware or software or partly in both, that implements a reconstruction algorithm to populate the voxel positions with image values based on the projection data λ to so build up the emission image. The re-constructer RECON can be implemented analytically or can be implemented iteratively as will be explored more fully below. Reconstructors RECON based on machine learning are also envisaged.

Reference is now made to FIG. 1B which shows a time diagram to illustrate three time periods involved in emission imaging, in particular in PET or SPECT. The proposed machine learning module MLM is configured to help reduce any one, any two or all three of said time periods, to thereby accelerate the overall time required from acquisition of the projection data to the point in time when the ready for view emission imagery is available for the user (e.g., a clinician) for diagnostic, therapeutic, educational, or any other purpose.

Broadly, in emission imaging one may distinguish between the following three phases: a preparatory phase, an acquisition phase and a reconstruction phase, chronologically in this order. The preparatory phase commences at time point $T_0$ when the patient PAT is administered the tracer agent that furnishes the source of radiation which is then detectable by the detector. A range of tracer agents is envisaged herein. Each of these tracer agents has different properties and may be used for different imaging purposes. Tracer agent is a combination of a radionuclide and a compound that is used by the organ of interest, such as sugars or other. Examples of tracer agents include Fluoro-deoxyglucose [$^{18}$F]FDG, or others. For present purposes, tracer agent also includes radioligands which are biochemical substances that include a ligand that is radiolabeled. A radioligand is designed to bind to a specific receptor so that specific functional aspects of biochemical pathways can be imaged. Alternatively, the radioligand may be designed to replace a (non-radiolabeled) compound/molecule in a metabolic process of interest.

After administration at time $T_0$ there follows (usually immediately, not necessarily, thereafter) a waiting period $\Delta TW$ where the patient is asked to wait so that the tracer agent can distribute with the blood flow in the patient's body so as to accumulate at the targeted organ or group of organs of interest. This waiting period can be considerable, for example 60 minutes or longer.

In general, the waiting period is a function of an average kinetics of the tracer agent over a population. The kinetics of the tracer distribution is broadly as follow. After administration into the patient's blood-pool of a pre-determined type and amount of tracer agent, which may depend on patient bio-characteristics and organ of interest, the tracer agent travels with the blood-flow and starts accumulating at the organ of interest. The tracer agent starts clearing from the blood-pool and perfuses into the organ of interest at a certain uptake rate. Ideally, this uptake rate is higher than that of the blood and the surrounding tissue and organs not of interest. Perfusion, and hence the concentration of tracer argent in the organ of interest, increases in a ramp-up phase, and at one point plateaus to then eventually drop off. Traditionally, the waiting period is a long as it takes for perfusion of tracer agent in the organ of interest to commence. For best results, the waiting period expires once, in the perfusion phase, concentration of the tracer agent in the organ of interest plateaus. This plateauing phase may be referred to herein as the saturation period. In certain scenarios there may be additional factors other than the plateauing that define the optimal scan point. For example, if the radio ligand is receptor bound, the limited amount of available receptors can be occupied quite quickly by flooding the blood with the radiotracer. Assuming that those bindings are not released anymore, it is usually preferable to wait with commencing the acquisition washout is progressed enough to provide a sufficient feature to background contrast.

After the end of the waiting period $\Delta TW$, the acquisition time period $\Delta TA$ follows, not necessarily immediately at start time $T$ (a point in time). During the acquisition time period $\Delta TA$, the patient resides in the examination region and read-out circuitry of the detector D is enabled to collect count data, that is, the projection data $\lambda$. After this period, which may or may not follow-up immediately, the so collected projection data $\lambda$ can be re-constructed by the reconstructor RECON. The reconstruction operation, a computational task, may consume a time period $\Delta TR$ at the end of which emission imagery is available which can then be displayed, stored or otherwise processed.

The above described time-driven protocol can be seen to give rise to various kinds of data associable with the time periods. For instance, the projection data can be said to be associated with the acquisition time period. The different lengths of acquisition time periods $\Delta TA$ will give rise to a projection data of different quality. More particularly, the longer the acquisition time period, the lower in general the noise level in the collected projection data. In general, the projection data $\lambda$ can be thought of as being made up from ground truth signals which are superimposed by noise contributions. The longer the acquisition time, the less the noise contribution, that is, the higher the signal to noise ratio (SNR). On the hand, the longer the acquisition period, the longer it takes to obtain the wanted imagery in image domain.

In another aspect, the projection data can also be said to be associated with the length of the waiting period. Again, the longer the waiting period up until the saturation phase commences, the better, in general, the quality of the projection data obtainable in the scan as more of the contrast agent has accumulated at the site of interest. But yet again, this comes at a time cost.

Yet another data versus time associability can be defined for the reconstruction phase. For instance, in particular for iterative re-constructors that start in image domain to proceed to the final output image may need a number of iterations to achieve acceptable convergence and hence image quality of its output image. In general, the longer the reconstruction algorithm is allowed to run the more iterations are carried out and the better the image quality of the (final) output image. Thus, the output imagery can be said to be associated with the length of the reconstruction time period.

The proposed machine learning module allows reducing any one, any two or preferably all three of the above defined three time periods $\Delta TW$, $\Delta TA$ and $\Delta TR$. Any one of the above said time periods can be reduced to respectively $\Delta T^*$, $\Delta TA^*$ and $\Delta TR^*$ with earlier acquisition start time $T^*$ (another point in time) as indicated in FIG. 1B. The overall time for arriving at the desired emission imagery in image domain can hence be reduced by up to 50% or even more with the newly proposed machine learning module MLM.

Specifically, the machine learning module allows reducing the waiting time for a patient down to a reduced waiting time $\Delta TW^*$ which may be as little as 15 or 20 minutes as compared to a complete waiting time of about 60 minutes. The complete waiting time is in general a function of the type of tracer agent used and may also depend on certain bio-characteristics of the patient such as age, sex, weight, medical history etc. Traditionally, the waiting times are usually prescribed by protocols to achieve good image quality, such a high SNR, high contrast, etc. However, with the proposed machine learning module the waiting time can be reduced as the patient is allowed into the acquisition time period after a shorter waiting time or reduced waiting time period $\Delta T^*$. The machine learning module is configured to map early projection data associated with the reduced waiting time to another set of projection data that represents an approximation of later projection data. Later projection data relates herein to projection data that would have been obtained had the full waiting period $\Delta TW$ exhausted as traditionally prescribed for the said patient type and/or for the tracer agent used.

In addition or instead to waiting time reduction, the acquisition time can also be reduced in this manner and the machine learning component or a similar machine learning component maps such early projection data acquired during a reduced acquisition time period $\Delta TA$ to another projection data set that represents the later projection data. The later projection data that would have been obtainable had the patient resided in the examination region for the longer prescribed period $\Delta TA$. Again, this acquisition time period is in general prescribed for the type of tracer agent used and/or bio-characteristics of the patient.

In another application scenario of the proposed machine learning module this can be used in conjunction with the re-constructer of the iterative type to reduce the reconstruction time $\Delta TR$. More particularly, intermediate imagery produced by the re-constructer during the course of i iteration cycles mapped by the machine learning module into a different version of the intermediate imagery. The different version is an estimate of intermediate imagery that would have been obtainable after more iteration cycles j>i. The machine learning module thus allows leap-frogging computationally costly iteration cycles

|j−i|. The proposed machine learning module in this embodiment may thus be understood as an "iteration booster". The new versions of intermediate imagery may then be fed back into the re-constructer RECON to continue with the iteration cycle. The proposed machine learning module allows reducing reconstruction time, but may also helps avoiding that the underlying reconstruction algorithm, which may be formulated as optimization problem, gets trapped in local minima of an objective function used in the optimization. Such local minima trapping may result in poor unrealistic imagery.

In order for the machine learning module MLM achieve the above described reductions of the respective time periods, the machine learning module is suitably trained on training data as will be explained in more detail below. The machine learning module learns during training to pick up sufficient contrast in even noisy projection data or imagery to sufficiently approximate image signals with higher signal to noise ratio that traditionally incurred longer time periods as explained above at FIG. 1B. Whilst a single machine learning module may be used to achieve all three of the time period reductions, this is not necessary herein and respective dedicated machine learning modules may be trained and used, tailored to reduce a respective one of the three time periods.

The projection data associated with reduced waiting time and/or reduced acquisition time will be referred to herein as early projection data as opposed to the later projection data which is associated with the respective longer time periods. This terminology carries over into image domain, to define early imager reconstructable from early projection data, and later imager reconstructable from later projection data. Thus, the proposed machine learning module allows computing from early projection data/early imagery in sufficient approximation later projection data/later imagery that would have been obtainable had the traditional longer time periods been observed. A similar concept applies to the iteration cycles, where more later intermediate imagery (at a later cycle j) can be estimated by the machine learning module from early intermediate imagery (at an earlier cycle i) as produced in the course of the reconstruction iterations.

The machine learning approach as proposed herein may be conceptually understood as follows: there is an underlying latent, "unknown", mapping between early projection data/early reconstructions and later projection data/later reconstructions, and also accordingly between early intermediate imagery and later intermediate imagery in the context of reconstruction iterations. The machine learning module is capable of learning these latent mappings from suitably defined training data examples, During the training, parameters of an initial model of the machine learning module is adapted based on the training data, as will be described in more detail below.

The training data as envisaged may include example imagery or example projection data either obtain from historic records or suitably synthesized. In addition, the training data may optionally include non-image-type contextual data CXD that describes the type of tracer agent used and/or bio-characteristics of the patient such as age, sex, weight, medical history etc.

It appears that the proposed machine leaning approach allows picking up later data already from the early data despite the low SNR. Specially, it seems there is already enough radiation emitted by the radiotracer during ramp up phase. With machine learning, there is hence no need to wait, as traditional protocols mandate, for the saturation phase to set in. With machine learning, the acquisition period can thus commence earlier and may even be shortened. It is assumed that the desired structural information is already sufficiently present in the data acquired after the reduced waiting time ΔTW. It appears that the useful structural data is only partially masked by the present background signal due to the incomplete blood-pool clearance during ramp up phase. The proposed machine learning approach facilitates to reduce this masking effect to recover from the masked data a suitable estimate of the unmasked, later, data. Similarly, it appears machine learning approach can pick up enough structural patterns from i) the early, low SNR, projection data already after a shorter acquisition period than previously used or from ii) intermediate imagery in image domain, even after fewer iterations that commonly used.

Training of the machine learning module occurs in a preparatory training phase in which an initialized model is adjusted to obtain the pre-trained machine learning module. After training, in deployment phase, the sufficiently pre-trained machine learning module may then be used to compute the above described data during clinical use.

Both training phase and deployment phase will be described below in more detail. The machine learning module is capable of being used in projection domain or image domain. Accordingly, the machine learning module may be used, relative to the re-construction stage as implemented by the reconstructor RECON, in a pre-processing stage or in a post processing stage. In addition, the machine learning module may also be used in an intra-processing embodiment within the reconstruction process to reduce iteration cycles and hence reconstruction time.

The post processing, pre-processing and intra-processing embodiments will now be described in more detail referring first to the deployment phase in FIGS. 2-5 where it is assumed that the machine learning model has been sufficiently trained, based on training data, into the pre-trained learning module MLM. FIGS. 6-9 explore in more detail the learning phase.

Figure 2:
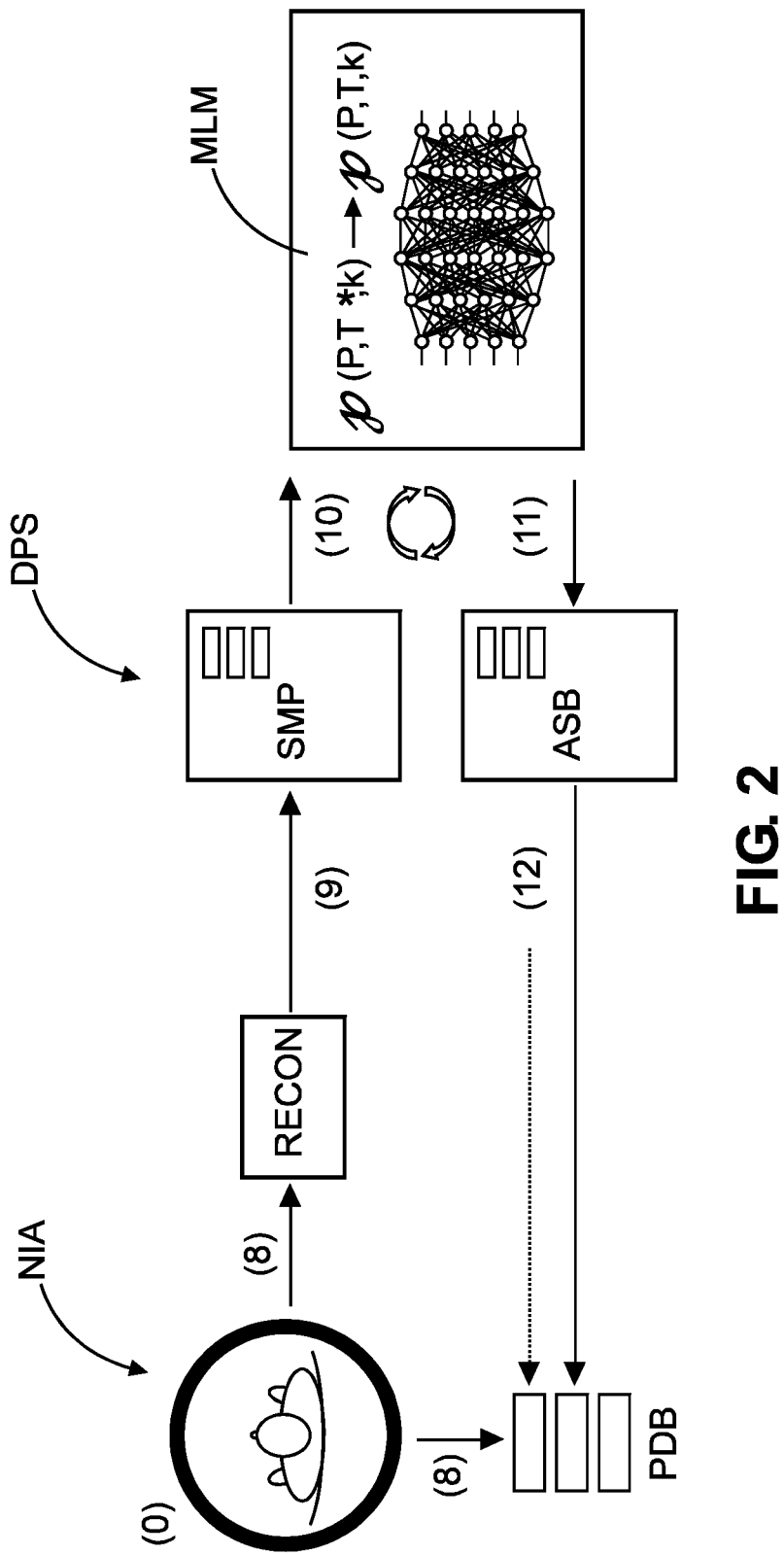
FIGS. 2-9 show block diagrams of systems for supporting nuclear imaging in different embodiments.

Turning now first to the deployment phase, reference is now made to FIG. 2 which shows a data processing section DPS with a pre-trained machine learning module configured for waiting time reduction. Broadly, the pre-trained machine learning module MLM takes PET projection data reconstructed from early projections acquired after reduced waiting period ΔTA* as input and predicts an estimate for a later emission image V'. The predicted later emission image V' is expected to approximately match an activity distribution contrast that would have been achievable by reconstructing from later projection data acquirable had the full waiting period been used with (later) standard start time T. The pre-trained machine learning module MLM thus corrects for both, typical dynamic changes in the contrast pattern and for changes in the noise properties and image sharpness, such that the resulting visualization of the individual tracer distribution as per estimated image V' matches in good approximation currently established medical standards.

With continued reference to FIG. 2, in deployment post-learning, early projection data (e.g., in PET list-mode) is acquired (0) after reduced waiting period $\Delta T_W^*$ at earlier start time T*. The early projection data is fed (8) into the PET reconstruction module RECON to obtain early emission imagery. The reconstructed early image represents spatial activity distribution. Optionally the early projection data is stored in a patent database PDB or in another suitable memory. Optionally, as may also be done in the training phase (more on which further below), the reconstructed early PET imagery is sub-sampled (9) by a sampler SMP in sub-sets (referred to herein as "patches" $p$ ). The patches $p$ have preferably the same size as in the training phase. The patches $p$ are fed (10) into the machine learning module MLM and are individually transformed into patches $p'$ (11) that estimate such patches for later imagery based on projection data acquired after full waiting time with later/standard acquisition start at T. The estimated patches are then re-assembled (12) by an assembler ASB according to their original location in order to form the estimated later 3D emission image V' than may be used for clinical diagnosis. In FIG. 2 and in the following drawings, the location is indexed by location index "P", and the notation $p$ (P,T,k) indicates the patch $p$ at location "P" for time "T". "k" is an optional index for database storage to facilitate retrieval.

The machine learning module MLM in FIG. 2 operates in image domain, post-reconstruction as post-processor. In a variant to the post-processing embodiment in FIG. 2, the machine learning module MLM may operate instead in projection domain. In this pre-processing embodiment, the machine learning module MLM has been pre-trained to predict later projection data associated with full waiting period from projection data associated with the reduced waiting time period after tracer administration. The reconstructor RECON then uses the estimate for the later projection data to reconstructor the later image V'. The sampler/ assembler set-up is again optional and is also optional in all of the below described embodiments in FIGS. 3-11.

Figure 3:
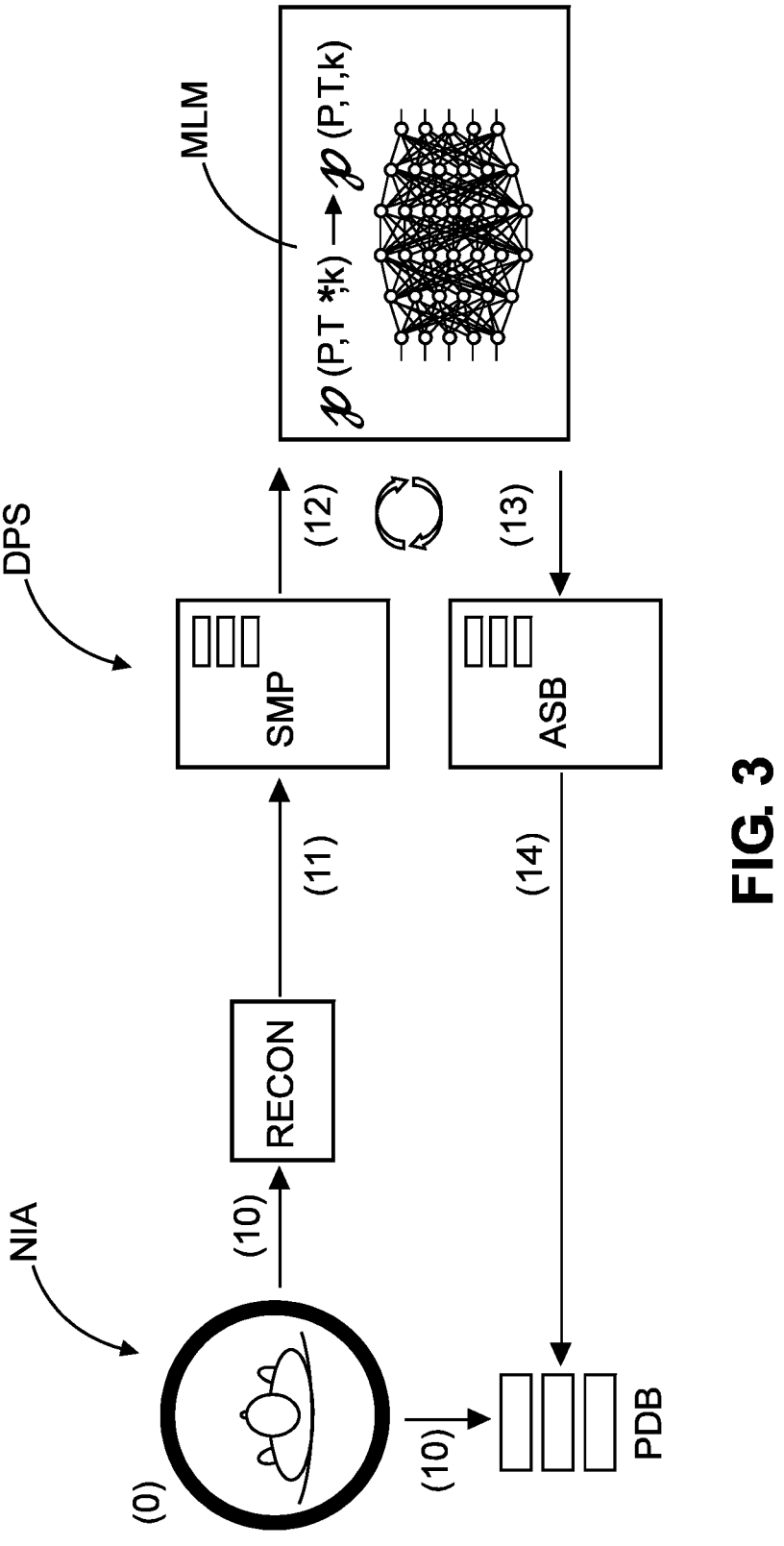

Referring now to FIG. 3, this shows a block diagram of a system including a prost-processing embodiment of the machine learning module MLM pre-trained to process early PET imagery based on early projection data acquired with reduced acquisition time.

In more detail, projection data (e.g., in PET list-mode or sinogram more) in respect of a patient is acquired with shorter scan duration and the early projection data so obtained in fed (1) into the PET reconstructor RECON. Optionally, the data is stored in patient database DBD. The early, and hence noisy, reconstructed PET image is option-ally sub-sampled by sampler SMP in patches $p$ , preferably of the same size as in the training step (see below at Figures). The patches are $p$ individually transformed by the trained ANN into patch estimates $p'$ that approximate image infor-mation obtainable from later projection data at standard scan time (13). The estimates $p'$ are re-assembled by assembler ASB form the final 3D image V' that may be used for clinical diagnosis or other.

Figure 4:
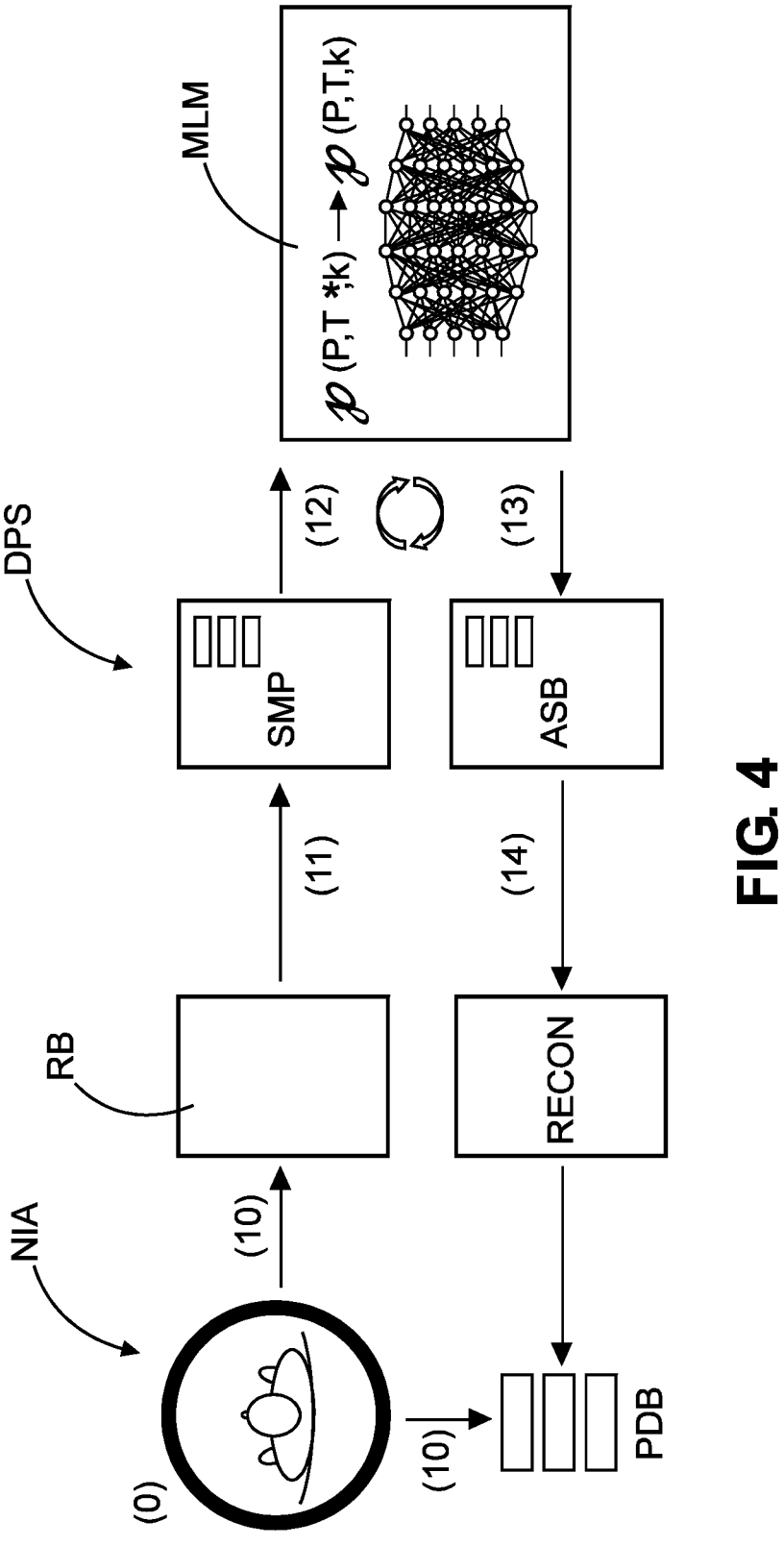

Reference is now made to FIG. 4 which is used as a pre-processor where the machine learning module MLM operates in projection domain. Patient projection data (e.g., in PET list-mode format) is acquired with shorter scan duration and is then fed into an optional PET re-binning module PP to transform the projection data into PET sino-gram format (10). The, because of the reduced acquisition time, noisy PET sinogram (11) is optionally sub-sampled in patches, preferably of same size as used in the training phase. The patches $p$ are individually transformed by the pre-trained machine learning module MLM into patch esti-mates $p'$ associable with standard acquisition scan time period (13). The estimated patches $p'$ are re-assembled by assembler ASB to form an estimate for a complete PET sinogram (14) λ'. The reconstructor RECON may use the estimated later sinogram to reconstruct the output 3D PET image V' associable with standard scan time for clinical diagnosis. The re-binner PP is optional and the machine learning module MLM may operate on the projection data λ in list mode.

Figure 5:
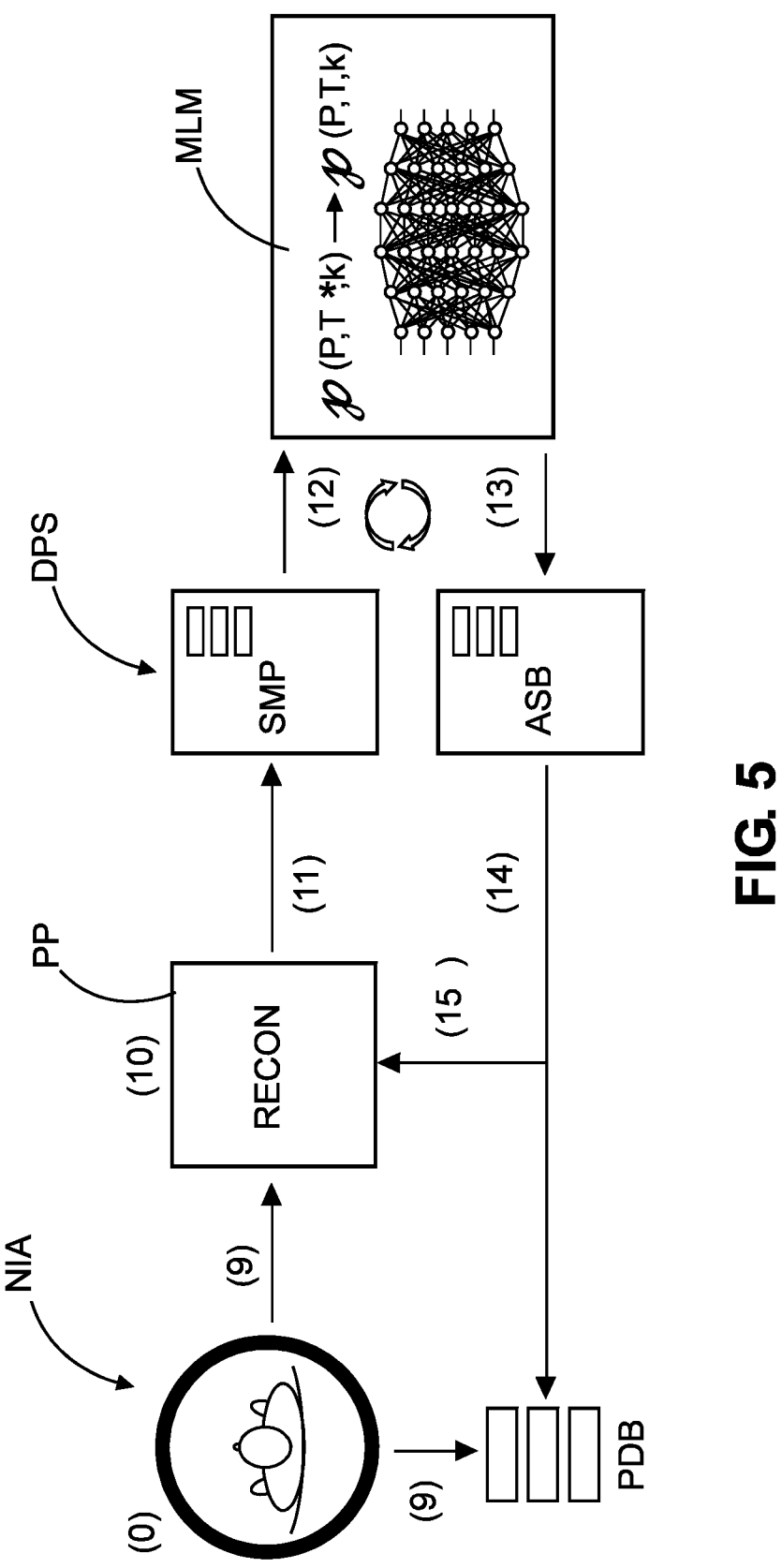

Reference is now made to the system in FIG. 5, where the pre-trained machine learning module MLM is configured for intra-processing in cooperation with the reconstructor RECON to reduce reconstruction time to a reduced period $\Delta T^*_R$.

Patient projection data λ (e.g., in PET list-mode) is acquired with shorter scan duration or standard acquisition time. The projection data is then fed into the PET recon-struction (9) which is preferably of the iterative type. After each or every k-th>1 or indeed at random chosen iteration step (10) during the iterative PET reconstruction cycle, an intermediate PET image available at the given iteration step (11) is optionally sub-sampled into patches $p$ , preferably of the same size as in the training phase. The patches $p$ are individually transformed by the trained ANN into patch estimates $p'$ that represent image information associable later iteration steps (13). The image information can in the estimated patches hence represents more fully converged image information. The patches are re-assembled by ASB to form new intermediate 3D PET image V' (14) that may be used by the reconstructor RECON for the next one or more iterations (15) or, if a stopping condition is fulfilled, the intermediate image V' may be provided as final output for final clinical diagnosis or other applications.

With reference FIGS. 6-9, the training phase of the above described systems in FIGS. 2-5 will now be described in more detail. The training phase is implemented on respective training systems TS. The respectively trained machine learn-ing modules MLM are obtained by the computerized train-ing system TS adapting a machine learning model M based on training data. The general setup of the trainings systems and how suitable training data may be collated will be described in the following in FIGS. 6-9. The machine learning model, preferably of the artificial neural network type and the training algorithm will the described in more detail at FIGS. 10, 11 and 15.

In more general terms, by using the sub-sampling into patches as in the embodiments described herein, the machine learning module MLM may operate to provide better, more robust, noise reduction as the early imagery/ projection data or the reduced waiting-period projection data/imagery used herein is/are in general high noise with low SNR.

However, the patch size is preferably chosen differently for early imagery/projection data than it is for reduced waiting-period projection data/imagery. For example, in early imagery/projection data embodiments, the patch sizes are chosen small enough to turn the machine learning module MLM "anatomy agnostic". Anatomic agnosticism prevents the detection of large-scale anatomy features by the network MLM during training and inference, and focuses the learning and inference capacity of the network MLM on noise reduction unaffected by the actual anatomy. Other-wise, without the said anatomy agnostic property, the net-work may behave unpredictably in situations where patho-logic or atypical anatomy is present. However, in the embodiments for waiting period reduction, the patch sizes are preferably chosen not too small. The network should preferably not turn anatomy agnostic. Specifically, in embodiments for waiting period reduction, the machine learning module should be preferably aware of the anatomi-cal context as the behavior of the tracer, its accumulation and ramp-up etc is different for different organs/tissue type. The subsampling into the patches if is optional, and may be left-out altogether in particular in embodiments for waiting period reductions.

Figure 6:
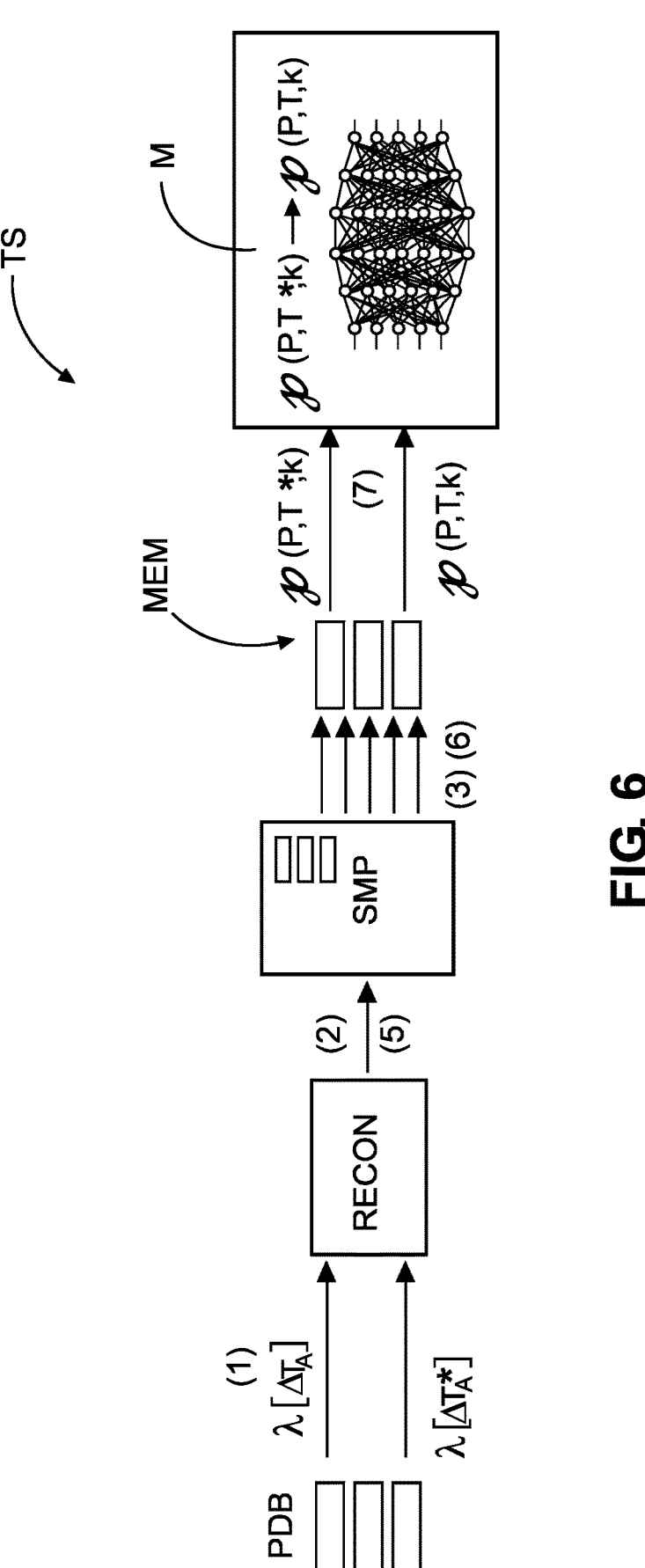

Turning now first to FIG. 6 this shows a training system TS for training a model M for the machine learning module MLM as used in FIG. 2. Figure further describes how in embodiments the training data may be procured.

Reference is now made first to training data procurement. For a given patient, raw patient projection data $\lambda$ acquired at two different acquisition start times (T, T*), and hence for two different waiting time periods, may be are used for training an initialized model M. In embodiments, the model is an artificial neural network having a set of pre-loaded initial parameters (also referred to as weights). Historic datasets for the two differing acquisition on-set times T* and T may be retrieved from a patient study database as pairs for a given patient. The training data may be obtain from historic data as may be held in the PACS or other medical data repository. The acquisition time periods for both data sets for T*,T may be assumed equal, but this is not limiting herein, as acquisition time periods of different durations $\Delta T_A$ and $\Delta T_A^*$ may be used instead for the training data. The respective projection data in FIG. 6 is indicated as $\lambda [\Delta T_A]$ and $\lambda [\Delta T_A^*]$, respectively. The acquisition periods are likely standard acquisition periods.

In order to achieve a higher flexibility during the initial training phase, it may be useful to retrieve from the PACS or other medical data repository, historic studies where a dynamic PET scan was performed. In this type of PET protocols, projection data for some or each bed position (along the longitudinal axis Z of patient) inside the imager's bore is acquired multiple times during the entire acquisition, thus automatically yielding projection data acquired at different start times T* and T. Specifically, in dynamic PET, acquisition starts essentially immediately after tracer administration to acquire projection data (preferably in list-mode), from which radiation versus time curves per voxel can be reconstructed. The said curves are also called "time activity curves" (TAC). Training data can be thus procured from a dynamic PET data by pairing up early data (image or protection data) with later data (image or projection data) to form pairs of training data, including a respective pair of training input and its associated target. Training aspects will be explained in more detail below.

In TB scans, the historic PET data may relate to different bed positions. Data for different start times may not necessarily represent the same anatomy. This potential issue may be eliminated by training the model M based on anatomy agonistic strategies, such as the mentioned sampling of patches from the training data. The leaning can thus be better focused on the different noise pattern rather than particulars of the anatomy. In this way, a larger pool of training data may be harnessed.

Preferably, a total-body PET scanner maybe used to acquire in particular dynamic PET projection data $\lambda$ in list- or sinogram mode that covers a large FOV for a long acquisition time period of e.g. 15-90 minutes after tracer injection. By using the dynamically extended PET raw data, one may decide for a suitable T* selection later or train several networks models M with T*-dependent training data. By doing so, T* does not need to be known precisely which simplifies clinical routine, e.g. in case a patient scan cannot be performed after T*=15 minutes already but only after e.g. T*=30 minutes instead. However, a total-body PET setup is not necessarily required herein, and the dynamic PET acquisition may be practiced instead with a scanner having a standard bore not covering the whole patient along image axis Z. In general, in dynamic acquisition protocols one is able to ascertain how the tracer distributes in the body by obtaining a time series of reconstructed PET imagery, as opposed to a single static PET image per bed position in standard (non-dynamic) protocols.

Referring now to the training process, as an initial step in the model M training, the identified historic patient data is sampled by sampler SMP into the spatial sub-samples or "patches" $p$ previously referred to. In this embodiment, and as indicted above, patch size is preferably chosen such that it preserves the anatomical context of the selected region as this useful for proper contrast adjustment during learning. Alternatively, no sampling into patches is used in waiting-time reduction embodiments.

As an example where sampling is used, and with continued reference to FIG. 6, for a given patient, data sets acquired at T are retrieved from the patient study database (1) and reconstructed (2). Subsequently, patches are derived from the resulting reconstructed imagery and stored (3) into a patch database MEM. The data acquired at T* are processed similarly (4, 5, 6). The patch database MEM is organized in a way that allows retrieving matching patch pairs for the same spatial location for each patient study.

During the training process, the model M (e.g. a multi-layer convolutional neural network) is provided with pairs of a random T*-patches as input and the linked T-patch as the prediction target. The resulting prediction error is quantified by an objective function F. Learning strategies such as back-propagation may be used to improve the objective function, in particular model M's accuracy in respect of the prediction target and the estimate provided by the model M for a current set of parameters. Using a plurality, for example all available patch-pairs, the training of model M is continued until a stopping conduction is fulfilled, e.g. until a certain overall prediction quality level is reached. By using the above described training data procurement based on selecting from historic dynamic PET data, the model M can be trained based on projection data from a single patient. The above described training data set procurement based on dynamic PET protocols is not necessary to use a total body PET imager.

Furthermore, reliance on dynamic PET is not a necessary for all embodiments envisaged herein, and projection data from standard PET may be used instead. Furthermore, data from a plurality of patients may be used instead of from a single patient. The data may be suitably queried in medical data repositories to locate historic images reconstructed from projection data acquired at different start times.

Instead of training the model M based on reconstructed imagery in image domain, the same training scheme in FIG. 6 may be applied instead to the projection data in projection domain.

Figure 7:
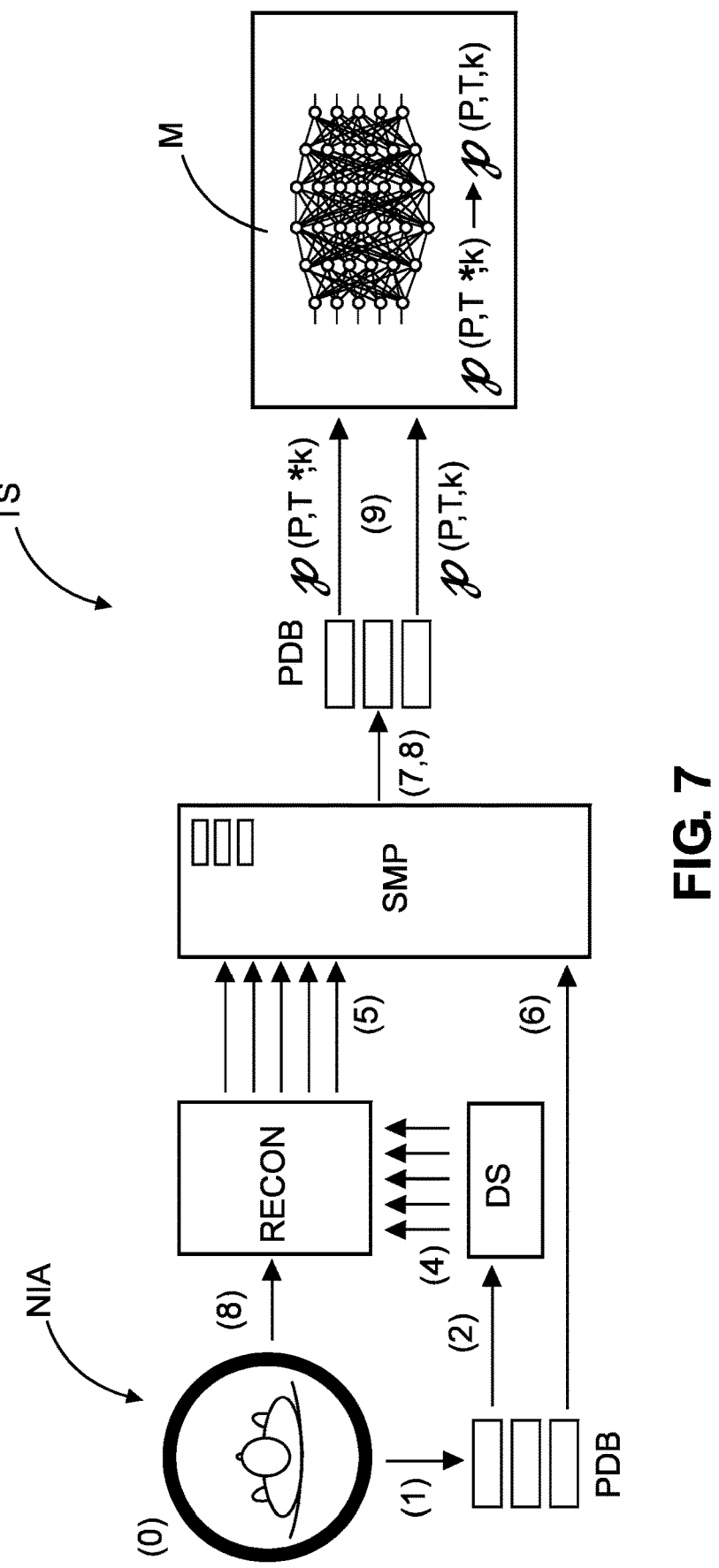

Reference is now made to FIG. 7, which shows a schematic diagram of a training system TS for training a model M as used in the machine learning module MLM for acquisition-time-reduction of FIG. 3.

Specifically, (1) historic patient data such as projection data in PET list-mode data or reconstructed PET imagery are located by suitable data-base search/query in a patient study database (e.g. in the PACS).

As preparation for the training of the model M, the projection data (for example in list-mode format) is retrieved from the database and down-sampled by a down sampler DS. For example, multiple copies are created with a significantly reduced number of event entries (4). This can be achieved e.g. by random sampling with a predefined set of sample probabilities or, less preferably, by deterministic sampling, such by removing every k-th entry, k>1.

The down-sampled list-mode files are reconstructed into PET images representing shorter acquisition duration times $\Delta TA *$: $\Delta T1$, $\Delta T2$, . . . , $\Delta TN$ (5). Optionally, an anatomy-agnostic scheme is used as in the above described embodiments. For example, the sampler SMP setup is used. For example, based in the reconstructed imagery, K spatial patches $p$ are derived and stored in a patch database PDB (7). Similarly, also K patches $p'$ from the exact same spatial sub-volume are created from the original imagery, and also stored into the same (or different) patch data base (8). Two patches $p$, $p'$ for the same spatial location then define a training data pair.

During the training process, using model M is provided with some of all the patches $p$ representing shorter acquisition duration $\Delta TA *$ as training input. The spatially matching counterpart patch $p'$ from the original (full dataset) reconstructions (9) form the respective targets for the training inputs.

In this manner, the model M attempts to predict high(er)-quality (e.g., higher SNR) patches $p$ that represent longer acquisition periods $\Delta TA$ from the spatially down-sampled patch(es) $p$ that represent shorter $\Delta TA *$. The resulting prediction errors may be are used (e.g. via back-propagation or other machine learning techniques) to improve the ANNs accuracy for a plurality (preferably all) of the available patch pairs in the training data set, until e.g. certain overall prediction performance level is reached.

The training method of FIG. 7 may be applied instead to projection domain, so no reconstructor is necessarily required in the training. sinogram mode format may preferably be used in the projection domain embodiment. Again, the anatomy-agnostic scheme is optional.

Figure 8:
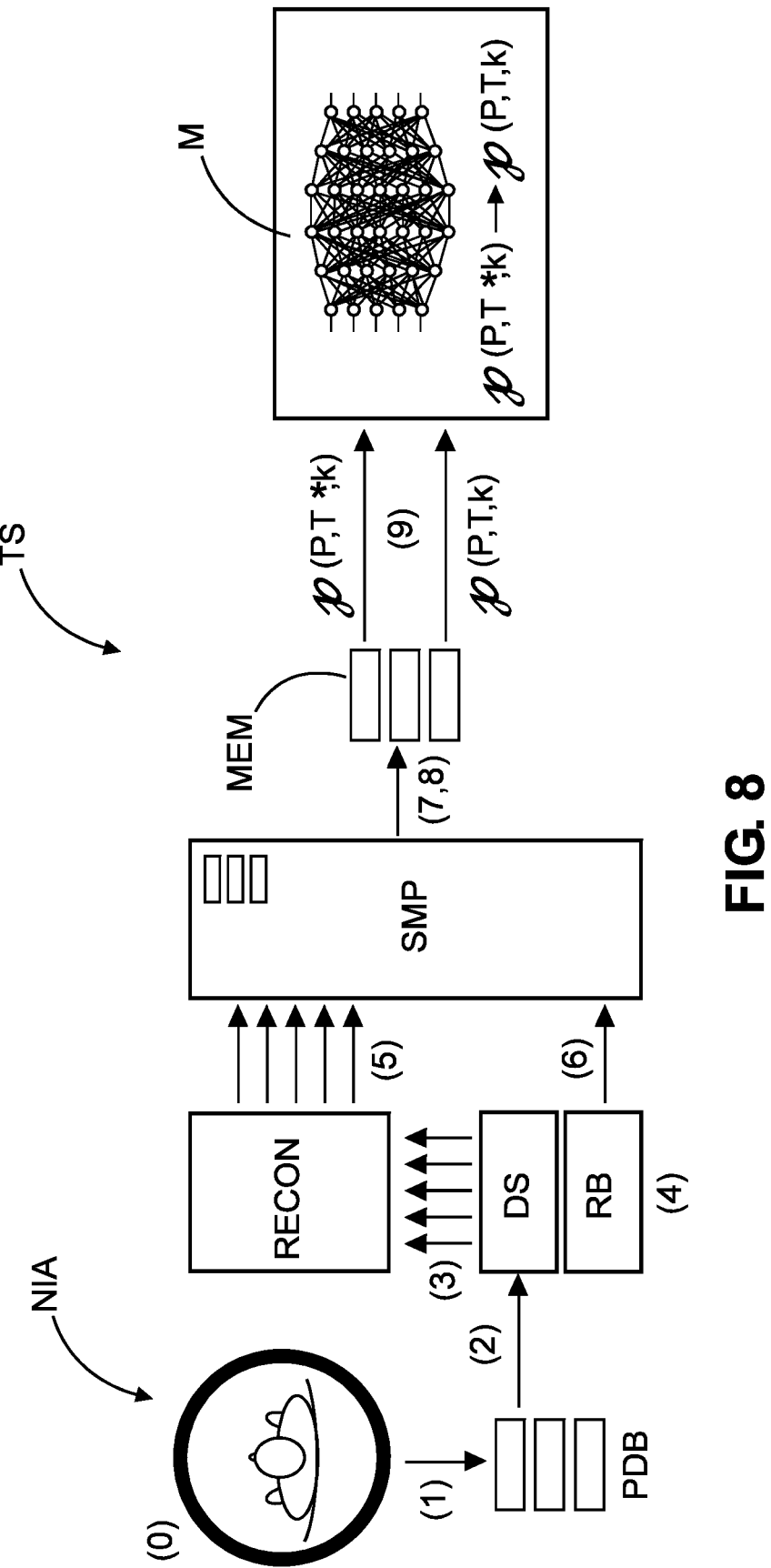

Reference is now made to FIG. 8 which shows a schematic diagram of a training system TS for training a model M as used in the machine learning module MLM for acquisition-time-reduction of FIG. 4 in projection domain.

Specifically, (1) historic patient data such as projection data in PET list-mode data are located by suitable data-base search/query in a patient study database (e.g. in the PACS).

As preparation for the training of model M, projection data in list-mode data is retrieved from the database and down-sampled. In other words, multiple copies are created with a significantly reduced number of event entries (3), such as less than 70% or even less than 50% of the total set. This can be achieved as before in FIG. 7 e.g. by down-sampler DS random sampling with a predefined set of sample probabilities or by deterministic sampling. Both the original and the down-sampled list-mode files are re-binned into 3D or 4D PET sinograms (4). 3D sinograms are sufficient if no time-of-flight information (TOF) is used, whilst 4D sinograms are used with TOF. The down-sampled projections represent shorter acquisition duration times $\Delta TA *$: $\Delta T1$, $\Delta T2$, . . . , $\Delta TN$ (5). Patch-wise data pairs may then be formed and stored in the patch data base (7), each data pair including patches that relate to the same spatial location as described above in FIG. 7. Training is then performed analogous to the scheme in FIG. 7, by using instead pairs of sinogram patches $p$, $p$. Again, learning based in patches are optional and learning may proceed instead on pairs of whole sinograms from different patients. Again, learning from patches allows more robust learning. Training can be done based on data from a single patient.

As in FIGS. 6-8, back-propagation may be used to adjust the model parameters based on the mismatch between the model's training output based on training input patch $p$, and the target $p$ associated with the training input patch $p$ for a plurality (preferably all) pairs.

Figure 9:
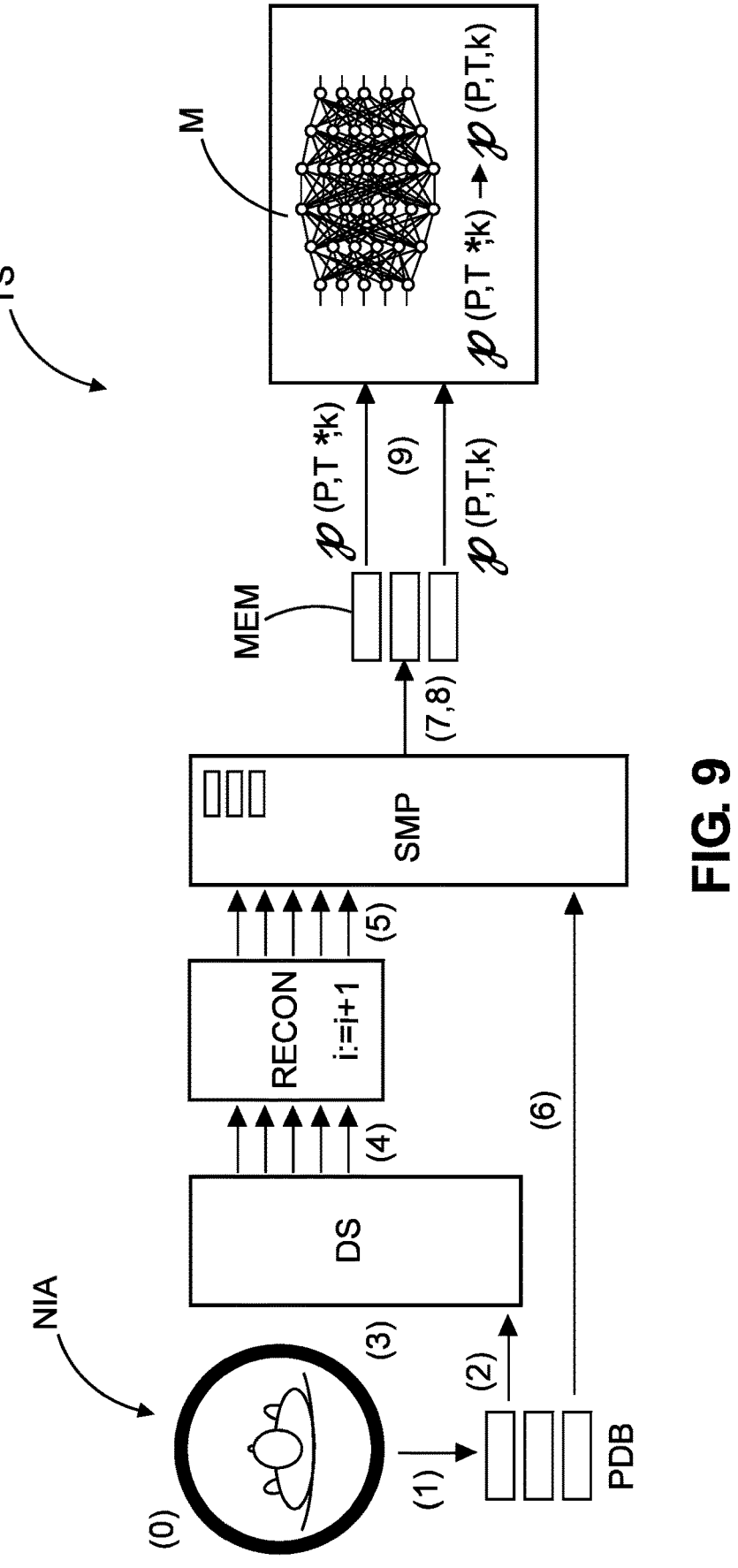

Reference is now made to FIG. 9 which shows a schematic diagram of a training system TS for training a model M as used in the machine learning module MLM for reconstruction-time-reduction of FIG. 5.

Specifically, historic patient data, including projection data in PET list-mode data and reconstructed PET imagery, is located in a patient study database (e.g. in the PACS).

As preparation for the training the model M, the list-mode data are retrieved from the database and are iteratively reconstructed using a specified number Nit of iterations to obtain intermediate images. Intermediate images obtained at an earlier iteration cycle are matched up with intermediate images obtained at a alter interaction cycle to form training pairs $(V_j, V_k)$, with k>j denoting the iteration cycles. Pairs for different patients may be used. The pairs of imagery $(V_j, V_k)$, may be optionally decomposed by sampler SMP into corresponding pairs of patches $(p, p')$. As an alternative, historic data of iteratively reconstructed imagery may already include the intermediate images stored and not only the final image so the above described reconstructions may not need to be performed, and the pairs of early cycle and later cycle intermediate images may be readily formed.

The model M is then provided with an early cycle intermediate image $V_j$ or patch $pj$ as training input. The model M produces training output which is compared with the later interaction cycle image $V_k$ or patch $p_k$.. Based on the comparison the parameters of the model are adjusted to improve prediction performance.

Optionally, a down-sampling may be used to represent shorter and longer acquisition times, thus combining this training method with the training methods as per FIGS. 7-8. Specifically, for each intermediate iteration result, a set of PET images representing shorter acquisition duration times $\Delta TA *$: $T\Delta 1$, $\Delta T2$, . . . , $\Delta TN$ (5) is generated resulting in N×I intermediate PET images. From these images, K spatial the spatially sub-sampled patches $p$ are derived and stored to in the patch data base MEM (7). Similarly, also K patches from the exact same spatial sub-volume are created and also stored into the Patch data base MEM (8).

During the training process, the model M is provided with a plurality (preferably all) of the patches k representing shorter acquisition duration T* and Nit different convergence states as input together with the matching patch k from the original (full dataset) final reconstructed PET image (9) as target.

The model then attempts to predict the high(er)-quality patch associated with time T from the down-sampled intermediate patch(es) associated with $\Delta T *$. The resulting prediction errors are used in a back-propagation training algorithm or other to improve the model's prediction accuracy for preferably all available patches until a condition if fulfilled, for example, a certain overall prediction performance is reached. In order to improve performance of the machine learning, the training input data may comprise a time series (at two or more time points) of data representative of said earlier scan data, short scan data or earlier iteration data, respectively.

In general, each of the above described training systems TS can be combined with one or more (or all) of the other trainings systems.

Figure 10:
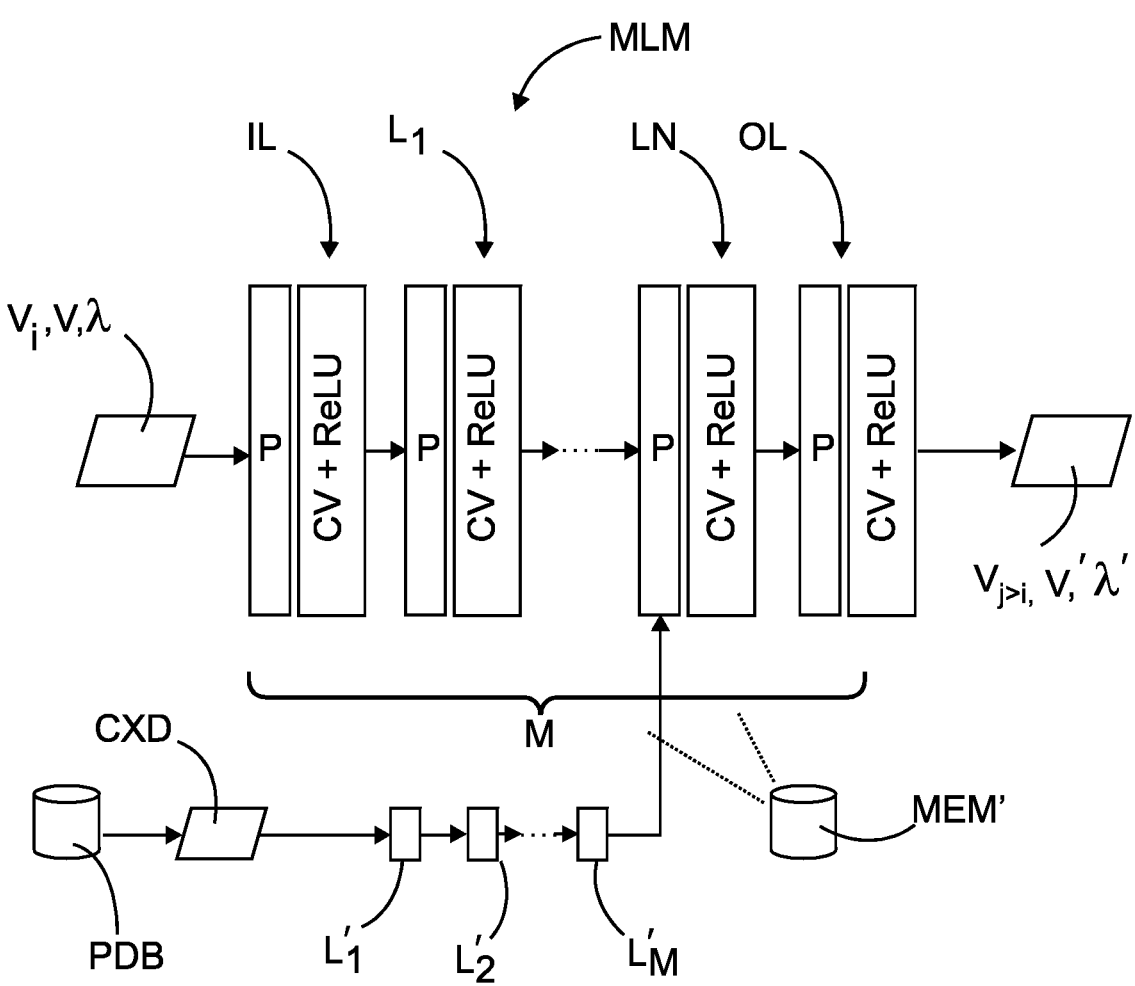
FIG. 10 shows a block diagram of a machine learning model.

Turning now in more detail to the machine learning model M, reference is made to FIG. 10. Preferably, the model M is an artificial neural network. FIG. 10 shows a schematic block diagram of a neural network M of the feed-forward type. The network M is preferably convolutional with layers that are not fully connected.

Functionally and conceptually, operation of the neural network M as used herein, is one of a regression, wherein the a-priori unknown latent relationship between i) the early projection data $\lambda$ or early reconstructed imagery V and ii) later projection data $\lambda'$ or later reconstruction V' is learned. The model may be understood to act as a denoiser as the early data (projection or reconstructed imagery) associated with reduced waiting time or acquisition time is expected to form low SNR version of the later data associated with longer (more conventional) waiting times and acquisition time. Early data is regressed into its den-noised later version. Imagery is hence mapped end-to-end. As similar relationship exists between imagery at different stages during the iteration cycle for iterative PET reconstruction algorithms and the neural network M can be trained to learn this relationship. The neural network NN is preferably a discriminative supervised machine learning model, which is implemented to solve the herein envisaged regressional image-to-image task.

The model M may be trained by the above described computerized training systems TS. In training, the training system TS adapts an initial set of (model) parameters $\theta$ of the model NN. In the context of neuronal networks models, the parameters are sometime referred to herein as weights. The training data may be generated by simulation or may be procured from existing historic imagery as may be found in medical image database such as in the PACS or similar database/repository, as described above in FIGS. 6-9. Two processing phases may thus be defined in relation to the machine learning model NN: a training phase and a deployment (or inference) phase.

In training phase, prior to deployment phase, the model is trained by adapting its parameters based on the training data. Once trained, the model may be used in deployment phase to denoise early data $V,\lambda,V_i$ (that is not from the training data) into versions $V',\lambda',V_k$, k>i of higher SNR, for any given patient PAT during clinical use. The training may be a one-off operation, or may repeated with new training data. The machine learning model M may be stored in one (or more) computer memories MEM'. The pre-trained model M may be deployed as a machine learning component that may be run on a computing device PU, such as a desktop computer, a workstation, a laptop, etc or plural such devices in a distributed computing architecture. Preferably, to achieve good throughput, the computing device PU includes one or more processors (CPU) that support parallel computing, such as those of multi-core design. In one embodiment, GPU(s) (graphical processing units) are used.

Referring now in more detail to FIG. 10, this shows a convolutional neural network M in a feed-forward architecture. The network M comprises a plurality of computational nodes arranged in layers in a cascaded fashion, with data flow proceeding from left to right and thus from layer to layer. Recurrent networks are not excluded herein. Convolutional networks have been found to yield good result when processing image data.

In deployment, the early data is applied to input layer IL. The early data $V,\lambda$, or $V_i$ then propagates through a sequence of hidden layers $L_1$-$L_N$ (only two are shown, but there may be one or two, or more than three), to then emerge at an output layer OL as a estimate for later data V', $\lambda'$, or $V_k$, k>i, denoised versions of the early data. The later data output V', $\lambda'$, or $V_k$, k>i has the same size as the early input V, $\lambda$, or $V_i$. The network M may be said to have a deep architecture because it has more than one hidden layers. In a feed-forward network, the "depth" is the number of hidden layers between input layer IL and output layer OL, whilst in recurrent networks the depth is the number of hidden layers, times the number of passes.

The layers of the network, and indeed the input and output imagery, and the input and output between hidden layers (referred to herein as feature maps), can be represented as two or higher dimensional matrices ("tensors") for computational and memory allocation efficiency. The dimension and the number of entries represent the above mentioned size.

Preferably, the hidden layers include a sequence of convolutional layers, represented herein as layers $L_1$-$L_{N-k,k>1}$. The number of convolutional layers is at least one, such as 2-5 or any other number. The number may run into double-digit figures.

In embodiments, downstream of the sequence of convolutional layers there may be one or more fully connected layers but this is not necessarily the case in all embodiments and indeed preferably no fully connected layer is used in the architecture envisaged herein in embodiments.

Each hidden $L_m$ layer and the input layer IL implements one or more convolutional operators CV. Each layer $L_m$ may implement the same number of convolution operators CV or the number may differ for some or all layers.

A convolutional operator CV implements a convolutional operation to be performed on its respective input. The convolutional operator may be conceptualized as a convolutional kernel. It may be implemented as a matrix including entries that form filter elements referred to herein as weights that form at least a part of the model parameters $\theta$. It is in particular these weights that are adjusted in the learning phase. The first layer IL processes, by way of its one or more convolutional operators, the input early data V, $\lambda$, $V_i$. Feature maps are the outputs of convolutional layers, one feature map for each convolutional operator in a layer. The feature map of an earlier layer is then input into the next layer to produce feature maps of a higher generation, and so forth until the last layer OL combines all feature maps into the output volume V'. The last combiner layer may also be realized as convolution that provides the estimates V', $\lambda'$, or $V_k$, k>i as an output feature map having the same size as the respective input data V', $\lambda'$, or $V_k$, k>i.

The convolutional operators in the input layer IL and some or all hidden layers, are preferably 3D. That is, there is convolution across the spatial dimensions, to better account for spatial correlations in all 3 spatial dimensions.

A convolutional operator CV in a convolutional layer is distinguished from a fully connected layer in that an entry in the output feature map of a convolutional layer is not a combination of all nodes received as input of that layer. In other words, the convolutional kernel is only applied to sub-sets of the input volume V, or to the feature map as received from an earlier convolutional layer. The sub-sets are different for each entry in the output feature map. The operation of the convolution operator can thus be conceptualized as a "sliding" over the input, akin to a discrete filter kernel in a classical convolution operation known from classical signal processing. Hence the naming "convolutional layer". In a fully connected layer an output node is general obtained by processing all nodes of the input layer.

The stride of the convolutional operators can be chosen as one or greater than one. The stride defines how the sub-sets are chosen. A stride greater than one reduces the dimension of the feature map relative to the dimension of the input in that layer. A stride of one is preferred herein. In order to maintain the dimensioning of the feature maps to correspond to the dimension of the input imagery, a zero padding layer P may be applied in embodiments. This allows convolving even feature map entries situated at the edge of the processed feature map.

The above described processing in FIGS. 2-9 of image-type data, either in projection domain or image domain, can be augmented by co-processing of non-image-type data such as bio-characteristics, medical history of the patient to which the processed image-type data relates. The non-image type data is also called herein contextual data XCD as this data furnishes context to the image-type data. Non-image data often leads to sparse data when represented in neural network time settings. Embeddings or other coding techniques may be used to suitably transform the non-image type data into "pseudo-images" which can then be processed together with image type data. Neural network architectures with multi-strand processing may be used as shown at the bottom of FIG. 10.

In multi-strand processing there are one or more additional strands of separate layers that process the input image data and non-image data respectively. In embodiments the output of those one or more additional strands (only one strand is shown in FIG. 10) are then merged and processed together with the image-type data to compute the output later data V', $\lambda$', or $V_k$, k>i.

One such separate strand is shown at the bottom of FIG. 10 as an additional sequence of cascaded layers $L'_{1-M}$. There may be one, two, three or more such layers. Preferably the non-image data processing strand $L_1', L_2', \ldots L_M'$ include fully connected layers that process embeddings of the non-image data into pseudo-images. Specifically, there may be only such fully connected layer (at the exclusion of convolutional layers) in the non-image data processing strand $L'_{1-M}$. The pseudo-images are concatenated or otherwise merged with feature maps produced by one or more hidden layers in the image-type processing strand $L_1$-$L_N$. In embodiments, an embedding operation is achieved by using an autoencoder architecture in the non-image processing strand $L'_{1-M}$ to obtain a suitable representation (the pseudo-images) for the non-image data that can be fed into the image processing strand $L'_{1-N}$.

The multi-strand processing architecture may include deconvolutional layers including deconvolutional operators that act as quasi-inverse operators to the convolutional operators. This allows multi-resolution processing. Examples of neural networks models with multi-resolution capability include U-net architectures as reported by Olaf Ronneberger et al in *"U-Net: Convolutional Networks for Biomedical Image Segmentation"*, published in Navab N., et al. (eds) "Medical Image Computing and Computer-Assisted Intervention—MICCAI 2015", Lecture Notes in Computer Science, vol 9351, pp 234.

Instead of processing the image-type input data V, $\lambda$, $V_i$ as whole, the sampler SMP may sample the image data V, $\lambda$, $V_i$ first into the above mentioned patches p, and the patches are then passed through the network M.

It will be understood that the above described model M in FIG. 10 is merely according to one embodiment and is not limiting to the present disclosure. Other neural network architectures are also envisaged herein with more or less or different functionalities than describe herein, such as pooling layers or drop-out layers or others still. What is more, (regressional) image-to-image models envisaged herein are not necessarily of the neural network type at all. Other, classical statistical regression methods based on sampling from training data are also envisaged herein in alternative embodiments. Still other techniques may include Bayesian networks, or random fields, such as Markov type random field and others.

The training system TS and the machine learning model M as may be used herein is now explained in more detail with reference to FIG. 11.

In the above described architectures for CNN-type models M, the totality of the weights W for all convolutional/deconvolutional filter kernels of the CNN model NN define a configuration of the machine learning model. The weights may differ for each layer and each layer may include plural convolutional operators some or each having a different set of kernels W. It is these weights Wj that are learned in a training phase, where index j runs over layers and convolutional operators therein. Once the training phase has concluded, the fully learned weights, together with the architecture in which the nodes are arranged, can be stored in one or more memories MEM' and can be used for deployment.

Figure 11:
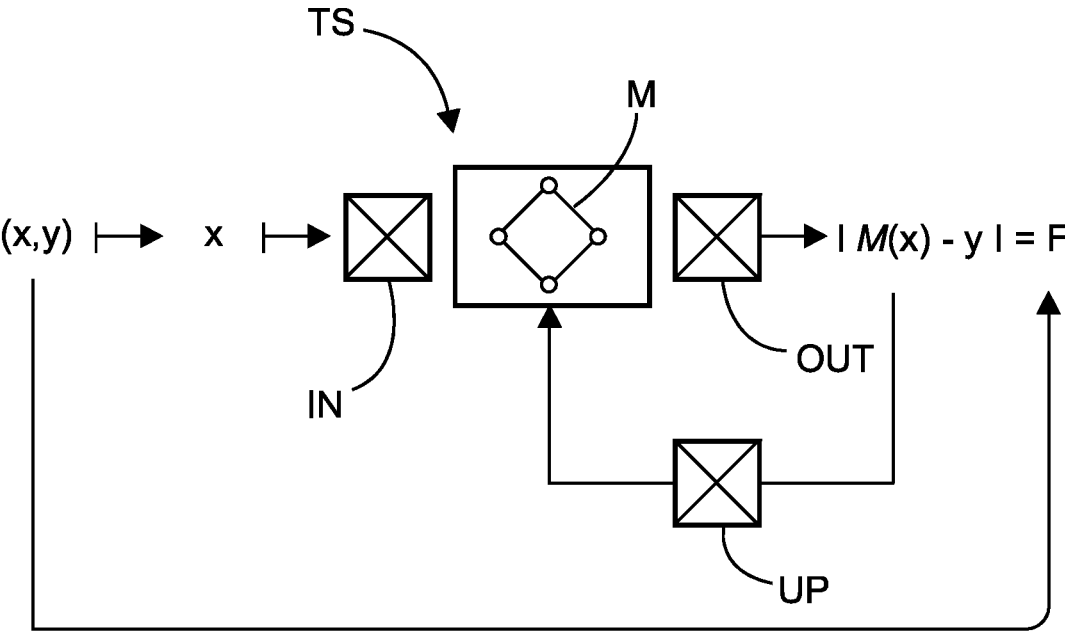
FIG. 11 shows a training system for training a machine learning model.

In more detail, FIG. 11 which shows a training system TS for training the parameters, i.e. the weights of machine learning model such as in a convolutional neural network as discussed in FIG. 10 or other.

The training data comprises pairs k of data ($x_k$, $y_k$). The training data comprises for each pair k (the index k is not related to the index used above to designate generation of feature maps), training input data $x_k$ and an associated target $y_k$. The training data is thus organized in pairs k in particular for supervised learning schemes as mainly envisaged herein. However, it should be noted that non-supervised learning schemes are not excluded herein.

The training input data $x_k$ may be obtained from historical image data acquired in the lab or previously in the clinic and held in image repositories. The targets $y_k$ or "ground truth" may represent examples of low noise images, whereas the $x_k$ are corresponding images with higher noise level. It is not necessary herein that the pair $x_k, y_k$ represents the exact same anatomy for the same patient.

In line with the above described embodiments in FIGS. 2-9, the training input data $x_k$ may include early projection data $\lambda$ or early imagery V. The associated target $y_k$ includes respectively, the later projection data $\lambda$ or later imagery V'. For the intra-processing embodiment, the training input data $x_k$ includes intermediate reconstructed imagery $V_i$ for earlier iteration cycle i, and the associated target $y_k$ is intermediate reconstructed imagery Vj for a later iteration cycle j>i.

In the training phase, an architecture of a machine learning model M, such as the shown CNN network in FIG. 10 is pre-populated with initial set of weights. The weights $\theta$ of the model NN represent a parameterization $M^\theta$, and it is the object of the training system TS to optimize and hence adapt the parameters $\theta$ based on the training data ($x_k$, $y_k$) pairs. In other words, the learning can be formulized mathematically as an optimization scheme where a cost function F is minimized although the dual formulation of maximizing a utility function may be used instead.

Assuming for now the paradigm of a cost function F, this measures the aggregated residue(s), that is, the error incurred between data estimated by the neural network model NN and the targets as per some or all of the training data pairs k:

$$\text{argmin}_\theta F = \sum_k \left\| M^\theta(x_k) - y_k \right\| \quad (1)$$

In eq. (1) and below, function M( ) denotes the result of the model NN applied to input x. The cost function may be pixel/voxel-based, such as the L1 or L2 cost function. In training, the training input data $x_k$ of a training pair is propagated through the initialized network M. Specifically, the training input $x_k$ for a k-th pair is received at an input IL, passed through the model and is then output at output OL as output training data $M^\theta(x)$. A suitable measure $\|\blacksquare\|$ is used such as a p-norm, squared differences, or other, to measure the difference, also referred to herein as residue, between the actual training output $M^{\theta(x}_k)$ produced by the model M, and the desired target $y_k$.

The output training data $M(x_k)$ is an estimate for target $y_k$ associated with the applied input training image data $x_k$. In general, there is an error between this output $M(x_k)$ and the associated target $y_k$ of the presently considered k-th pair. An optimization scheme such as backward/forward propagation or other gradient based methods may then be used to adapt the parameters θ of the model NN so as to decrease the residue for the considered pair $(x_k, y_k)$ or a subset of training pairs from the full training data set.

After one or more iterations in a first, inner, loop in which the parameters θ of the model are updated by updater UP for the current pair $(x_k,y_k)$, the training system TS enters a second, an outer, loop where a next training data pair $x^{k+1},y^{k+1}$ is processed accordingly. The structure of updater UP depends on the optimization scheme used. For example, the inner loop as administered by updater UP may be implemented by one or more forward and backward passes in a forward/backpropagation algorithm. While adapting the parameters, the aggregated, for example summed, residues of all the training pairs are considered up to the current pair, to improve the objective function. The aggregated residue can be formed by configuring the objective function F as a sum of squared residues such as in eq. (1) of some or all considered residues for each pair. Other algebraic combinations instead of sums of squares are also envisaged.

Optionally, the training system includes the sampler SMP to sample the original training input image data into sub-volumes $\wp$ and the model M is then trained based on such sub-volumes, instead of processing the training input imagery V, λ, or $V_j$, at once as a whole. This allows achieving better learning due to enforcing an anatomy agnostic learning paradigm.

Optionally, one or more batch normalization operators ("BN", not shown) may be used. The batch normalization operators may be integrated into the model M, for example coupled to one or more of the convolutional operator CV in a layer. BN operators allow mitigating vanishing gradient effects, the gradual reduction of gradient magnitude in the repeated forward and backward passes experienced during gradient-based learning algorithms in the learning phase of the model M The batch normalization operators BN may be used in training, but may also be used in deployment.

The training system as shown in FIG. 11 can be considered for all learning schemes, in particular supervised schemes. Unsupervised learning schemes may also be envisaged herein in alternative embodiments. GPUs may be used to implement the training system TS.

The fully trained machine learning module MLM may be stored in one or more memories or databases. It may be made available as a cloud service. Access can either be offered free of charge or their use can be granted via license-pay or pay-per-use scheme.

With reference to flow charts in FIGS. 12-15, embodiments of methods for supporting nuclear imaging will now be explained. The following methods may underlie operation of the above discussed systems in FIGS. 1-11. However, the methods discussed below can also be understood as a teaching in their own rights, not necessarily practiced in any of the above discussed system architectures.

Figures 12, 13, 14, 15:
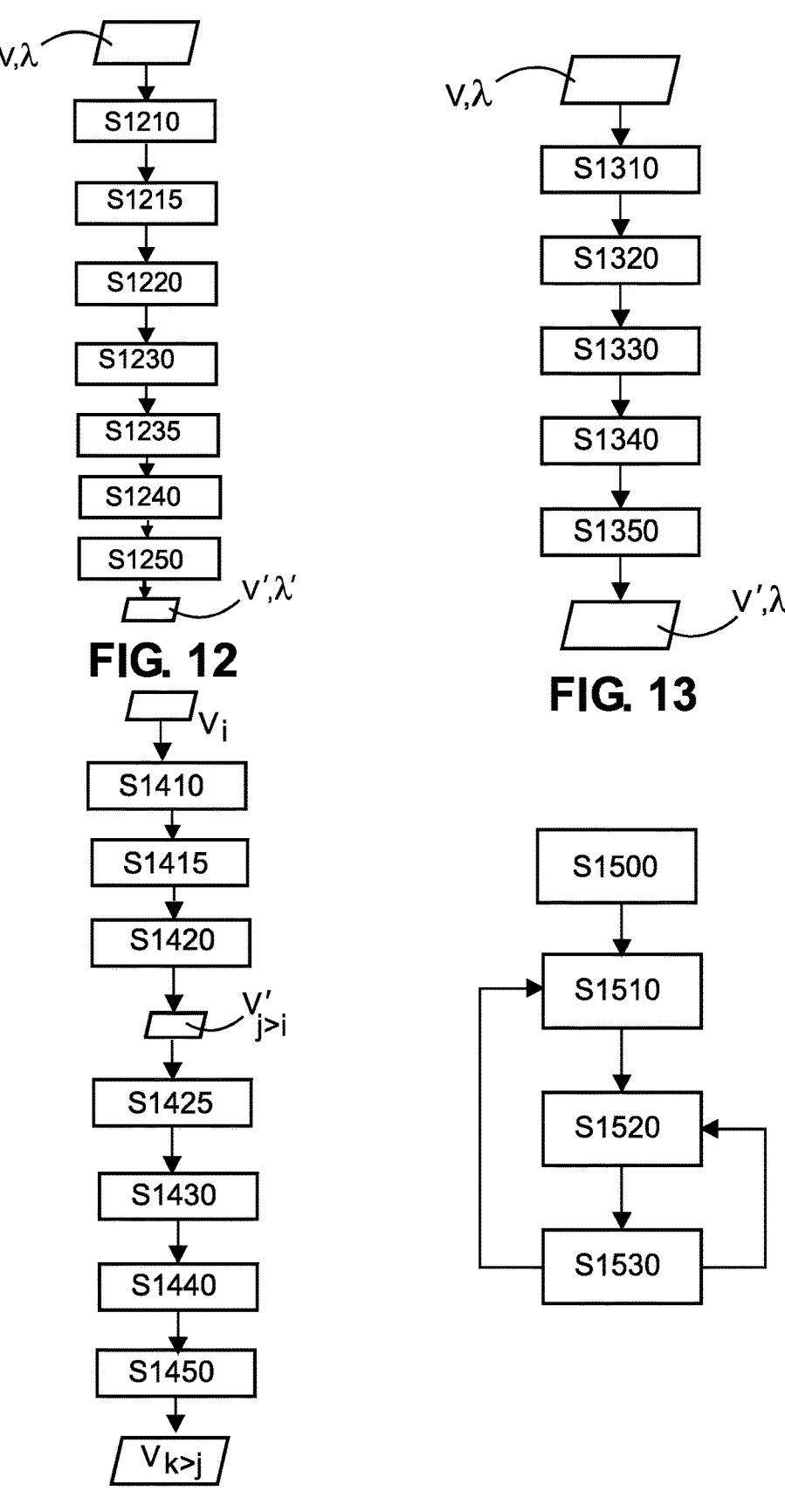
FIGS. 12-14 show flow charts of methods for supporting nuclear imaging according to different embodiments.
FIG. 15 shows a flow chart of a method for training a machine learning model.

In more detail and turning first to FIG. 12, this shows a flow chart of supporting nuclear imaging by reducing the above described patient waiting time ΔTW after administration of the tracer agent. The method may be used in pre-processing before reconstruction or post processing after reconstruction. In other words, the method is applicable in projection domain or image domain.

Turning first to application in projection domain, after administration of contrast agent to the patient and after a reduced waiting time ordinarily prescribed for the said patient and/or the tracer agent, the projection data acquisition commences at step S1210 in an emission imaging apparatus in whose bore the patient resides. In particular, due to the reduced waiting time ΔTW, projection data acquisition may start in the ramp up phase rather than in the saturation phase as is ordinarily done in conventional approaches.

This operation step S1210 results in early projection data which is then received at step S1220 in a machine learning module that has been pre-trained with training data, for example as described above or below at FIG. 15.

At step S1230, the pre-trained machine learning module processes the early projection data and computes an estimate for later projection data that would have been obtained had the projection data acquisition commenced after the full waiting period ordinarily prescribed for the patient and/or tracer agent used.

At step S1240 the estimated projection data is then passed to the reconstructor to reconstruct emission imagery in image domain, based on the estimated later projection data.

At step S1250 the so reconstructed imagery is then made available for display, storage or other processing.

This waiting time reducing method may also be applied instead in the image domain. In this embodiment, the projection data collected after reduced waiting time as per step S1210 now reconstructed first into a first version at step S1240 with the re-constructer in the usual manner to produce an early image and it is this early image that is then processed at step S1230 by the machine learning module to produce an estimate of a later image that may have been obtained had later projection data been used after exhausting the full waiting period ordinarily prescribed for the patient and/or the tracer agent used.

In each of the above pre- and post-processing embodiments of FIG. 12 it is not necessary that the later data set and/or later image is processed by the machine learning module at step S1230.

In the preferred embodiment in projection domain, anatomic-agnosticism as explained above is fostered by a sampling step S1215 in which the early projection data is broken up into patches (sub-sets) and it is these patches that are processed respectively by the machine learning module at step S1235 into respective sub-sets of estimated projection data. The so produced patches of estimated later projection data are then re-assembled at step S1235 into the estimated later projection and is then reconstructed at step S1240. Alternatively, the sub-sets are individually reconstructed first into volume parts in these are then assembled at step S1235 post-reconstruction.

The breaking up S1235 into sub-sets and the reassembling S1235 may also be used in the image domain embodiment, where it is the first version of the reconstructed image that is broken-up into sub-sets, and these image domain sub-sets are then processed at step S1230 by the machine learning module to produce the estimates for the sub-sets of the later image. The estimated sub-sets may then be reassembled into the final later estimate V'.

Reference is now made to the flow chart in FIG. 13 which shows another embodiment of a method of supporting emission imaging. This embodiment allows reducing acquisition time and proceeds as follows. Like the method in FIG. 12, this method too may be practiced in projection domain as pre-processing or in image domain as post-processing.

Referring first to the embodiment practiced in projection domain, at step S1310 early projection data is acquired with reduced acquisition time by the emission imaging apparatus with the patient residing in its bore.

The reduced acquisition time period may commence after the full waiting period or may commence after the reduced waiting period as described in FIG. 12. In other words, the method in FIG. 12 may or may not be used in combination with the method in FIG. 13.

The early projection data with reduced acquisition time is then received at a pre-trained machine learning module at step S1320.

The reduced acquisition time period is shorter than is ordinarily used for the tracer agent and/or the given the patient's bio-characteristics. The projection data collected in the reduced acquisition period may have a relatively low SNR. With the proposed method the acquisition period can be reduced so that the product of dose times the said acquisition time period is reduced relative to given a certain SNR threshold. In certain scenarios, a scan time of 2 min or less, down to one minute per position, may be achievable.

step S1330 the machine learning module then estimates from the early projection data, an estimate for later projection data that would have been obtainable, had the full acquisition time period ΔTA been used.

At step S1340 the estimated later projection data is then reconstructed by the re-constructer into reconstructed imagery in image domain.

At step S1350 the later imagery data V', based on projection date collected in the reduced time period ΔTA, is then made available for display, storage or is otherwise processed.

As before in FIG. 12, this method may also be practiced in image domain. In this embodiment, the machine learning module receives at step S1320 not projection data but early imagery reconstructed from the early projection data. At step S1330 in this embodiment the machine learning module then estimates in image domain from this early imagery an estimated later imagery that may have been obtained had the full acquisition time period been exhausted for the collection of the projection data.

Again, as in FIG. 12, it may again be beneficial rather than processing the whole projection data or image set, to first decompose this into sub-sets and to process the sub-sets with the machine learning module accordingly and later reassemble the estimated sub-sets to obtain the full projection data sets and/or image.

Reference now made to the flow chart in FIG. 14 which shows another embodiment of a method of supporting nuclear imaging. This method can be used on its own or in combination with either one or both of the methods described in FIGS. 12, 13.

The method in FIG. 14 is configured for intra-processing in that the machine learning module now operates jointly with the re-constructer during the reconstruction process. In particular, iterative reconstructions are envisaged herein and the machine learning model operates in in between iterations in interleaved fashion with the reconstructor RECON. Referring now in first in more detail to iterative reconstruction algorithm in general, this type of algorithms may be formulated as an iterative procedure for improving the objective function. Specifically, the procedure may be formulated in terms of optimization, in particular minimization, of a cost function. The cost function measures how well the estimated imagery provided during the iterations matches the actually observed projection measurements λ. A system matrix is used to forward-project the reconstructed imagery into the projection domain and to estimate this predicted projection with the actually measured projection data λ. A deviation between the actually measured data λ and the predicted projection as per the system matrix can be quantified by the cost function. In the iterations the predicted imagery is adapted to reduce the cost function, the algorithm thus converging towards the correct imagery. A dual formulation of the above described optimization is also contemplated which includes a maximization of a utility function.

In more detail, an iterative emission imaging reconstruction algorithm can be described as follows (excluding any attenuation correction for simplicity):

$$\lambda = A\left[f^i\right] \tag{2}$$

$$f_{i+1}^j = G\left(f_i^j\right) \tag{3}$$

λ is the emission projection data in list or frame mode A is the system matrix that describes a forward projection from image domain into projection domain $f^i$ is the i-th voxel in the imagery in emission image domain to be reconstructed G is an update function that updated voxels f during the iterations i.

The nature of G depends on the optimization algorithm used. Embodiments of G include update functions based on any one or more of the following numerical methods or techniques: gradient descent, stochastic gradient method, conjugate gradient, Nelder-Mead expectation maximization (EM), maximum likelihood methods, or any other.

In iterative reconstructions, a goal is to adjust the voxel values to that the residue as per (2) $\|\lambda - A[f^i]\|$ becomes sufficiently small, for example drops under a pre-defined threshold.

The reconstruction may be done in list-mode or in frame or sinogram mode.

The system matrix A may be pre-computed one-off, or "on the fly", during reconstruction. In the latter case, there is no need to necessarily hold the whole of the matrix in memory. Only parts of the system matrix are ever computed when required during the reconstruction, to save memory space.

Iterative reconstruction schemes as may be used herein are described in

W. Wang "*Systematic and Distributed Time-of-Flight List Mode PET Reconstruction*", published in "2006 IEEE Nuclear Science Symposium Conference Record", 2006, pp 1715-1722.

Turning now in more detail to the method for intra-processing in connection with reconstruction, the reconstruction algorithm processes projection data, which may be of early or later type, to produce therefrom at step S1410, via one or more iterations, a first input image in image domain $V_i$, which is received at the pre-trained machine learning module M.

The machine learning module at step S1420 then estimates from this input image $V_i$ an intermediate image V'. This immediate image V' is an estimate for an intermediate image that may have been obtained had the re-constructer performed more iterations i+k, beyond iteration cycle i that was expended at step 1410 for the reconstruction of input image.

At step S1430 the re-constructer then optionally continues with the iteration cycle(s), but this time based on the new intermediate image V' to produce a series of one or more intermediate images. The machine learning thus allows essentially leapfrogging k iterations, k>1.

At step S1440 the iterations are terminated based on user request or once a sopping conduction is met.

The current intermediate image at termination ma then be output at step S1450 as the final image $V_{i+1}$ which may then be displayed, stored or otherwise processed.

In embodiments it may also be possible to abort discontinue with iterations after the machine learning module has produced the new intermediate image V' as this may be deemed a good approximation already for the final image.

Also, it will be understood that the method can be practiced multiple times through the iteration cycles at pre-set or random iteration step intervals or upon user request. It is also envisaged in embodiment to effect displaying on a display device at certain iteration steps the imagery so far obtained and to then decide whether or not to continue with iterations, in particular whether to use the machine learning module to give the reconstruction process a boost thus accelerating convergence to a final output $V_{i+1}$.

The estimated intermediary imagery V' allows guiding the reconstruction iterations to better avoid local minima of the cost $\|\lambda - A[f]\|$ as per (2).

Again, as in embodiments in FIGS. 12-13, there may be a sample step S1415 and a reassemble step S1425, up and down stream, respectively of applying S1420 the machine learning module to encourage anatomic agnosticism as explained above.

Referring now to the flow chart in FIG. 15 this shows a training method for training the machine learning module as used in the above embodiments FIGS. 12-14.

Depending on which embodiment is used, 12, 13 or 14 and whether this embodiment is practiced in image domain or projection domain, suitable training data is procured and collated in step S1500. Preferably, supervised learning schemes are envisaged herein although this is not a necessity as unsupervised learning setups are also envisaged herein.

In supervised learning, the training data includes suitable pairs of data items, each pair including training input data and associated therewith a target training output data. Specifically, as in FIGS. 12, 13, the pairs comprise early projection data and later projection data and/or early imagery (reconstructed from early projection data) and later image data (reconstructed from later projection data). As above early and later projection data relates to projection data collected after reduced waiting time and/or reduced acquisition time period, whereas later projection data is collected after exhausting the full waiting time and/or exhausting the full acquisition time period. The imagery or the projection data can be paired up by retrieving the same from historic data records such as the PACS for instance.

Similarly, a suitable training data pairs for the intra-processing embodiment in FIG. 14 may be used as the intermediate imagery produced by the iterative re-constructer may be stored in memory and can be later accessed. The pairs $(x,y)=(V_i,V_j)$ may then be defined by pairing up an early intermediate image $V_i$ obtained at an earlier iteration step i, with a later intermediate image or a final image $V_j$ obtained at a later iteration step j, j>i.

The training data may be generated by simulation or may be gathered as historical data from databases such as the PACS in the HIS, or other database or repository.

With continued reference to FIG. 15, at step S1510 training data is received in the form of pairs $(x_k, y_k)$. Each pair includes the training input $x_k$ and the associated target $y_k$. $x_k$, as defined in FIG. 11 above.

At step S1520, the training input $x_k$ is applied to an initialized machine learning model NN to produce a training output.

A deviation, or residue, of the training output $M(x_k)$ from the associated target $y_k$ is quantified by a cost function F. One or more parameters of the model are adapted at step S1530 in one or more iterations in an inner loop to improve the cost function. For instance, the model parameters are adapted to decrease residues as measured by the cost function. The parameters include in particular weights W of the convolutional operators, in case a convolutional NN model M is used.

The training method then returns in an outer loop to step S610 where the next pair of training data is fed in. In step S1520, the parameters of the model are adapted so that the aggregated residues of all pairs considered are decreased, in particular minimized. The cost function quantifies the aggregated residues. Forward-backward propagation or similar gradient-based techniques may be used in the inner loop.

More generally, the parameters of the model NN are adjusted to improve objective function F which is either a cost function or a utility function. In embodiments, the cost function is configured to the measure the aggregated residues. In embodiments the aggregation of residues is implemented by summation over all or some residues for all pairs considered. The method may be implemented on one or more general-purpose processing units TS, preferably having processors capable for parallel processing to speed up the training.

The training method may include a pre-processing step S1515 to sample the input volume V at step S1510 into one or more sub-volume patches $p$. Step S1520 then proceeds based on such a sub-volume as described above, instead of on the whole volume, by using the spatially corresponding patches $p'$ as target. The method is repeated for plural such sub-volumes until an intended part, for example the whole volume, has been covered. The sampling may be random or deterministic.

In a preparatory step S15100, the training data is procured. In one embodiment, the data for the different waiting times is selected from historic dynamic PET data as explained above at FIG. 6. Alternatively, in historic projection data, preferably in list-mode, list entries are removed, either in pre-determined manner or at random to produce down-sampled versions of the projection data. The original, full list of projection data is retained as target whilst the down-sampled version is the associated training input.

As mentioned, two or all three methods as per FIGS. 12-14 may or may not be used in combination. If used in combination, a respectively different machine learning module MLM1-3 (not specifically designated in the Figures herein) may be trained and used herein, for reducing waiting time, scan time, reconstruction time, respectively.

The components of the data processing section DPS or the training system TS may be implemented as one or more software modules, run on one or more general-purpose processing units PU such as a workstation associated with the imager NIA, or on a server computer associated with a group of imagers.

Alternatively, some or all components of the data/image processing section DPS or of the training system TS may be arranged in software or in hardware. The hardware may include a suitably programmed microcontroller or microprocessor, such an FPGA (field-programmable-gate-array) or as a hardwired IC chip, an application specific integrated circuitry (ASIC), integrated into the imaging system NIR. In a further embodiment still, the image/data processing section DPS or of the training system TS may be implemented in both, partly in software and partly in hardware.

The different components of the data processing section DPS or of the training system TS may be implemented on a single data processing unit PU. Alternatively, some or more components are implemented on different processing units PU, possibly remotely arranged in a distributed architecture and connectable in a suitable communication network such as in a cloud setting or client-server setup, etc.

One or more features described herein can be configured or implemented as or with circuitry encoded within a computer-readable medium, and/or combinations thereof. Circuitry may include discrete and/or integrated circuitry, a system-on-a-chip (SOC), and combinations thereof, a machine, a computer system, a processor and memory, a computer program.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A data processing system (DPS) for nuclear medicine imaging, the data processing system comprising:
   an input interface (IN) for receiving first projection data ($\lambda$), the first projection data associated with a first waiting period ($\Delta T^*$), the first waiting period indicating a time period from administration of a tracer agent to a start of acquisition by a nuclear medicine imaging apparatus (IA) of the first projection data; and
   a computing device for running a trained machine learning model, trained based on time-series training input data, the trained machine learning model being configured to estimate, based on the first projection data ($\lambda$), second projection data ($\lambda'$) associable with a second waiting period ($\Delta T$), longer than the first waiting period ($\Delta T^*$).

2. The data processing system (DPS) of claim 1, wherein the second waiting period is prescribed by a type of the tracer agent.

3. A data processing system (DPS) for nuclear medicine imaging, the data processing system comprising:
   an input interface (IN) for receiving first projection data ($\lambda$), the first projection data associated with a first acquisition time period ($\Delta t^*$) for acquisition by a nuclear medicine imaging apparatus (IA) of the first projection data in respect of a patient with incorporated tracer agent; and
   a computing device for running a trained machine learning model, trained based on time-series training input data, the trained machine learning model being configured to estimate, based on the first projection data ($\lambda$), second projection data ($\lambda'$) associable with a second acquisition time period ($\Delta t$), longer than the first acquisition time period ($\Delta t^*$).

4. The data processing system (DPS) of claim 3, wherein the second acquisition time period is prescribed by a type of the tracer agent.

5. A data processing method for nuclear imaging, the method comprising:

receiving first projection data ($\lambda$), the first projection data associated with a first waiting period ($\Delta T^*$), the first waiting period indicating a time period from administration of a tracer agent to a start of acquisition by a nuclear medicine imaging apparatus (IA) of the first projection data;

inputting the first projection data ($\lambda$) to a trained machine learning model, trained based on time-series training input data, wherein the trained machine learning model is configured to estimate second projection data ($\lambda'$) associable with a second waiting period ($\Delta T$) indicating a prescribed time from the administration of the tracer agent to the start of the acquisition by the nuclear medicine imaging apparatus (IA) of the first projection data, wherein the second waiting period ($\Delta T$) is longer than the first waiting period ($\Delta T^*$); and outputting the second projection data ($\lambda'$) from the trained machine learning model.

6. The data processing method of claim 5, wherein the prescribed time is based on a type of the tracer agent.

7. A data processing method for nuclear imaging, the method comprising:

receiving first projection data ($\lambda$), the first projection data associated with a first acquisition time period ($\Delta t^*$) for acquisition by a nuclear medicine imaging apparatus (IA) of the first projection data in respect of a patient with incorporated tracer agent;

inputting the first projection data ($\lambda$) to a trained machine learning model, trained based on time-series training input data, wherein the trained machine learning model is configured to estimate second projection data ($\lambda'$) associable with a second acquisition time period ($\Delta t$) indicating a prescribed time for the acquisition by the nuclear medicine imaging apparatus (IA) of the first projection data, longer than the first acquisition time period ($\Delta t^*$); and outputting the second projection data ($\lambda'$) from the trained machine learning model.

8. The data processing method of claim 7, wherein the prescribed time is based on a type of the tracer agent.

* * * * *